United States Patent
Jahromi et al.

(10) Patent No.: US 11,193,551 B2
(45) Date of Patent: Dec. 7, 2021

(54) STABLE SHAPE-RECONFIGURABLE STRUCTURES AND MECHANISMS

(71) Applicant: The Regents of the University of California, Oakland, CA (US)

(72) Inventors: Babak Haghpanah Jahromi, Irvine, CA (US); Lorenzo Valdevit, Irvine, CA (US); Jonathan Hopkins, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 908 days.

(21) Appl. No.: 15/498,648

(22) Filed: Apr. 27, 2017

(65) Prior Publication Data

US 2020/0025272 A1     Jan. 23, 2020

Related U.S. Application Data

(60) Provisional application No. 62/328,290, filed on Apr. 27, 2016.

(51) Int. Cl.
*F16F 7/00*     (2006.01)
*F16F 1/02*     (2006.01)

(52) U.S. Cl.
CPC ............... *F16F 7/00* (2013.01); *F16F 1/025* (2013.01); *F16F 2230/34* (2013.01)

(58) Field of Classification Search
CPC ............................... F16F 7/00; F16F 2230/34
USPC ....... 206/736, 170, 174, 182, 183, 184, 186, 206/187, 189, 190, 191, 218, 600; 224/586; 267/141.7, 158, 160, 164, 182
See application file for complete search history.

(56) References Cited

U.S. PATENT DOCUMENTS

| | | | | |
|---|---|---|---|---|
| 2,037,675 A | * | 4/1936 | Boothby | B65D 3/02 229/4.5 |
| 3,512,227 A | * | 5/1970 | Krawagna | A45C 13/26 248/113 |
| 3,720,979 A | * | 3/1973 | Krawagna | A45C 13/005 16/227 |

(Continued)

FOREIGN PATENT DOCUMENTS

WO     2015164663 A1     10/2015

OTHER PUBLICATIONS

Shan, Sicong, et al. "Multistable architected materials for trapping elastic strain energy." Advanced Materials 27.29 (2015): 4296-4301.

(Continued)

*Primary Examiner* — Brent W Herring
(74) *Attorney, Agent, or Firm* — Thomas|Horstemeyer LLP

(57) ABSTRACT

In one embodiment, a shape-reconfigurable structure includes a rigid base having first and second ends, a rigid first beam having a lateral end and a central end, the lateral end being connected to the first end of the base, and a rigid second beam having a lateral end and a central end, the lateral end of the second beam being connected to the second end of the base and the central end of the second beam being connected to the central end of the first beam, wherein the structure can be placed in an expanded orientation in which the first and second beams extend outward away from the base and a contracted orientation in which the first and second beams extend inward toward the base.

14 Claims, 28 Drawing Sheets

(56) References Cited

U.S. PATENT DOCUMENTS

| | | | | |
|---|---|---|---|---|
| 5,870,806 | A * | 2/1999 | Black, Jr. | A44B 17/0023 24/102 A |
| 6,215,081 | B1 * | 4/2001 | Jensen | H01H 3/46 200/341 |
| 7,411,331 | B2 * | 8/2008 | Dubowsky | G01R 33/28 310/309 |
| 8,584,456 | B1 * | 11/2013 | McKnight | H02N 10/00 310/307 |
| 9,289,055 | B2 * | 3/2016 | Slocum | A46B 15/0038 |
| 9,791,014 | B1 * | 10/2017 | McKnight | F16F 7/00 |
| 10,030,733 | B2 * | 7/2018 | Seepersad | F16F 1/3737 |
| 10,767,032 | B2 * | 9/2020 | Pasini | C08L 7/00 |
| 2014/0020198 | A1 * | 1/2014 | Slocum | A46B 15/0038 15/167.1 |
| 2016/0032997 | A1 * | 2/2016 | Seepersad | F16F 1/3737 267/141 |
| 2017/0362414 | A1 * | 12/2017 | Pasini | C08L 7/00 |

OTHER PUBLICATIONS

Correa, Dixon M., et al. "Negative stiffness honeycombs for recoverable shock isolation." Rapid Prototyping Journal 21.2 (2015): 193-200.

Restrepo, et al., "Shae memory polymer based cellular materials", Mechanics of time-dependent materials and processes in conventional and multifunctional materials, vol. 3., The Society for Experimental Mechanics, Inc., 2011.

Felton, et al., "Self-folding with shape memory composites", RSC Publishing, Soft Matter, Sep. 2013, 7688.

Henrickson, et al., "Shape control of tensegrity structures", AIAA Space 2015.

Babaee, et al., "Harnessing deformation to switch on and off the propagation of sound", Advanced Materials, Materials Views, 28, 1631-1635, 2016.

Timoshenko, et al., Theory of Elastic Stability., McGraw-Hill International Book Company, Engineering Societies Monographs, 1963.

Felton, et al., "A method for building self-folding machines", Applied Origami, Sciencemag.org Science, vol. 345, Issue 6197, Aug. 2014.

Greet, et al., "Plasticity in small-sized metallic systems: Intrinsic versus extrinsic size effect", Progress of Materials Science 56, 2011.

Holst, et al., "Modeling and experiments of buckling modes and deflection of fixed-guided beams in compliant mechanisms", Department of Mechanical Engineering, Brigham Young University, Journal of Mechanical Design, ASME, 2011.

Correa, et al., "Negative stiffness honeycombs for recoverable shock isolation", Rapid Prototyping Journal, Mar. 2015.

Rupp, et al., "Switchable phononic wave filtering, guiding, harvesting, and actuating in polarization-patterned piezoelectric solids", Applied Physics Letters 96, 2010.

Maxwell, Clerk J., "On the calculation of the equilibrium and stiffness of frames", Philosophical Magazine, Series 4, May 2009.

Hanaor, et al., "Evaluation of deployable structures for space enclosures", International Journal of Space Structures, vol. 16, No. 4, 2001.

Gilpin, et al., "Miche: Modular shape formation by self-disassembly", The International Journal of Robotics Research, 2008.

Meza, et al., "Resilient 3D hierarchical architected metamaterials", PNAS, vol. 112, No. 37, 2015.

Puglisi, et al., "Mechanics of a discrete chain with bi-stable elements", Journal of the Mechanics and Physics of Solids, 48, 2000.

Evans, et al., "Concepts for enhanced energy absorption using hollow micro-lattices", International Journal of Impace Engineering, 37, 2010.

Salari-Sharif, Ladan, "Energy dissipation mechanisms in hollow metallic microlattices", J. Mater. Res., vol. 29, No. 16, 2014.

Kim, et al., "Curve decompoistion for large deflection analysis of fixed-guided beams with application to statically balanced compliant mechanisms", Journal of Mechanisms and Robotics, ASME, vol. 4, 2012.

Henrickson, et al., "Shape control of tensegrity airfoils", AIAA SciTech, 2016.

Shan, et al., "Multistable architected materials for trapping elastic strain energy", Advanced materials, Materials Views, 27, 2015.

Gao, et al., "Materials become insenstitive to flaws at nanoscale: lessons from nature", PNAS, vol. 100, No. 10, 2003.

Yu, et al., "Morpho: A self-deformable modular robot inspired by cellular structure", IEEE/RSJ International Conf. ON intelligent Robots and Systems, 2008.

Zhao, et al., "Post-buckling and snap-through behavior of inclined slender beams", Journal of Applied Mechanics, ASME, vol. 75, 2008.

Meza, et al., "Strong, lightweight, and recoverable three-dimensional ceramic nanolattices", Low density materials, vol. 345, Issue 6202, 2014.

Follmer, et al., "Jamming User Interfaces: programmable particle stiffness and sensing for malleable and shape-changing devices", DSpace at MIT, ACM, 2012.

Benichou, et al., "Structures undergoing discrete phase transformation", Journal of Mechanics and Physics of Solids, 61, 2013.

Yim, et al., "Modular self-reconfigurable robot systems", IEEE Robotics and Automation Magazine, Mar. 2007.

You, Zhong, "Folding structures out of flat materials", Science Mag., 2017.

Tibert, Gunnar, "Deployable tensegrity structures for space applications", Doctoral Thesis, Royal Inst of Technology, Dept of Mechanics, 2002.

* cited by examiner

STABLE SHAPE-RECONFIGURABLE STRUCTURES AND MECHANISMS

CROSS-REFERENCE TO RELATED APPLICATION

This application claims priority to U.S. Provisional Application Ser. No. 62/328,290, filed Apr. 27, 2016, which is hereby incorporated by reference herein in its entirety.

NOTICE OF GOVERNMENT-SPONSORED RESEARCH

This invention was made with Government support under grant contract number N000141110884 awarded by Office of Naval Research. The Government has certain rights in the invention.

BACKGROUND

Shape-reconfigurable materials and structures are capable of achieving significant morphological change upon application of relatively small loads and maintaining the desired shape when the loading is removed. This deformation is reversible and the original shape is recoverable by reversing the load direction. This property could pave the way for manufacturing of highly adaptable components that are fully reconfigurable based on functionality. For example, a multistable reconfigurable structure can be significantly compressed to be transported with considerably less cost before deployment, or it can be used to fabricate tools with multiple stable shapes for different purposes. Other foreseeable applications include energy and impact absorption, tunable phononic response, and vibration isolation.

Several strategies aimed at achieving these goals have been proposed, including foldable origami, tension controlled tensegrity structures, shape-memory morphing materials and structures, shape-shifting jamming materials, and modular self-assembled structures. In most of these systems, the ability of the material or structure to morph is limited in terms of allowable direction and amplitude of deformation. For instance, origami folding is often based on a single degree-of-freedom rigid folding mechanism and is an energetically inefficient strategy for multi-axial straining.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As identified above, current shape-reconfigurable materials and structures are limited in their ability to morph in terms of allowable direction and amplitude of deformation. Disclosed herein are shape-reconfigurable structures and mechanisms that, at least in some embodiments, exhibit greater ability to morph both in terms of direction and deformation. In some embodiments, the structures and/or mechanisms comprise one or more bistable shape-reconfigurable structures that can be placed and remain in, one of two different stable orientations, an extended orientation or a retracted orientation, until manipulated to move into the other orientation.

In some embodiments, the bistable shape-reconfigurable structures include a base and two beams that are connected to the base. The beams connect to the base and to each other with hinges (e.g., living hinges) that enable the beams to move relative to the base and each other. When the structure is in the expanded orientation, the beams are angled outward away from the base and the beams and the base together form a triangular shape. When the structure is in the contracted orientation, the beams are angled inward back toward the base so as to collapse the triangle and occupy less space.

The structures are completely reversible so that they can be repeatedly placed in one stable orientation or the other, as desired. Such structures can be used as fundamental building blocks that can be combined in small or great numbers to form simple or complex multistable shape-reconfigurable structures or mechanisms that can be placed in multiple stable orientations. Such structures and mechanisms can be two or three dimensional.

In the following disclosure, various specific embodiments are described. It is to be understood that those embodiments are example implementations of the disclosed inventions and that alternative embodiments are possible. All such embodiments are intended to fall within the scope of this disclosure.

Disclosed herein is a novel concept for achieving independent multi-axial deformation with high volumetric and morphological change in two- and three-dimensional structures based on unit cells comprising bistable shape-reconfigurable structures having living hinges. Each unit cell can comprise multiple bistable shape-reconfigurable structures that enable the volumetric and morphological change.

Figure 1A:
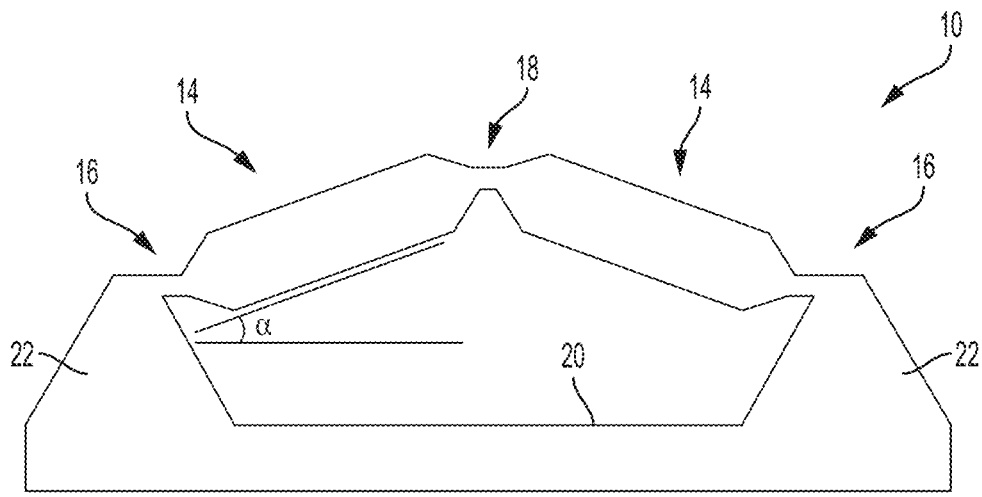
FIG. 1A is a side view of a first embodiment of a shape-reconfigurable structure, the structure shown in a first orientation.
Figure 1B:
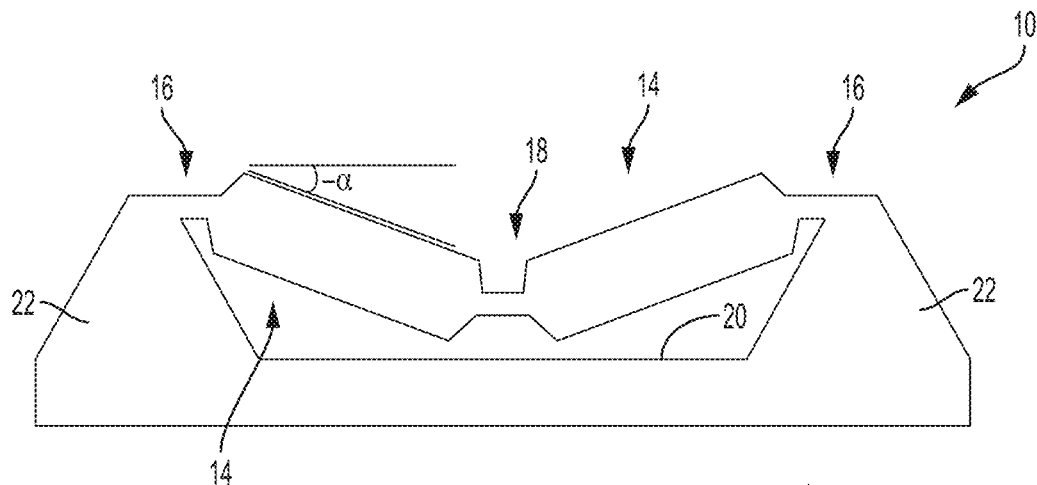
FIG. 1B is a side view of the shape-reconfigurable structure of FIG. 1A, the structure shown in a second orientation.

FIGS. 1A and 1B illustrate an example of such a bistable shape-reconfigurable structure 10, which can act as a fundamental building block that can be used in multiple numbers to form a great variety of multistable structures and mechanisms. As shown in FIG. 1A, the bistable shape-reconfigurable structure 10 generally comprises a rigid base 12 and two rigid beams 14, which are connected to the base with lateral hinges 16 and connected to each other with a central hinge 18. The base 12 itself comprises an elongated rigid member 20 that, in the example of FIG. 1, has a rectangular cross-section. Because the member 20 is rigid, it does not bend or otherwise deform during manipulation of the structure 10. The base 12 further comprises a spacer element 22 provided at and extending vertically upward from each end of the member 20, when the member is assumed to be aligned along a horizontal direction. As will be apparent from the discussion that follows, the spacer elements 22 provide space between the base 12 and the beams 14 that enables the structure 10 to be placed in the contracted orientation shown in FIG. 1B. In this example, each spacer element 22 has a generally triangular shape with the base of the triangle being parallel to the member 20 and the top tip of the triangle being flattened.

Both beams 14 are of equal length (a length shorter than the length of the base 12) and, in the embodiment of FIG. 1, also have rectangular cross-sections. In addition, however, each end of each beam 14 is tapered to enable the bistable shape-reconfigurable structure 10 to collapse into the retracted orientation. In the example of FIG. 1, each end of each beam 14 has a generally triangular tip that forms a point that extends along a longitudinal direction of the beam. Because the beams 14 are rigid, they also do not bend or otherwise deform during manipulation of the structure 10.

In some embodiments, the bistable shape-reconfigurable structure 10 is unitarily formed from a single piece of material, such as a polymer, metal, or ceramic material. In such cases, the hinges 16, 18 are flexible living hinges that are composed of the same material as the base 12 and the beams 14 and that are capable of bending and/or deforming to enable the structure 10 to be alternately expanded and contracted. In the illustrated embodiment, the hinges 16, 18 each comprise a thin, elongated piece of material having a rectangular cross-section. Notably, the hinges 16, 18 are thinner, and comprise less material, than both the base member 20 and the beams 14. It is for this reason that the hinges 16, 18 can bend and/or deform. In alternative embodiments, the hinges 16, 18 can be made to have lower flexural rigidity than the beams 14, 20 by using a relatively stiff material for the construction of the beams and relatively soft material for the hinges. This can be achieved through functional-grading or by forming the hinges 16, 18 from different materials, thereby implementing a bi-material design. In the illustrated embodiment, the hinges 16 extend horizontally from the top ends of the spacer elements 22 of the base 12 to the lateral ends of the beams 14 and the hinge 18 extends horizontally between the central ends of the beams.

In FIG. 1A, the bistable shape-reconfigurable structure 10 is shown in a first, expanded orientation in which the beams 14 are angled outward (upward) away from the base 12 such that the structure has a generally triangular shape. In this orientation, the central ends of the beams 14 and the central hinge 18 are positioned at a maximum distance away from the base 12 and each beam forms an angle $\alpha$ with the horizontal direction (which is parallel to the base).

FIG. 1B shows the bistable shape-reconfigurable structure 10 in a second, contracted orientation in which the beams 14 have been moved to a position in which they are angled inward (downward) toward from the base 12. As is apparent from FIG. 1B, the structure 10 is no longer triangle shaped while in this orientation (although it can be said that the structure has the shape of a triangle whose top has collapsed inward). The structure 10 can be placed in this orientation by applying a critical downward vertical force the top of the structure (e.g., at the central hinge 18) so as to cause the beams to snap downward into the contracted orientation. In this orientation, the central ends of the beams 14 and the central hinge 18 are positioned at a minimum distance away from the base 12 and each beam forms an angle $-\alpha$ (or approximately $-\alpha$) with the horizontal direction. Accordingly, the beams 14 can be moved through an angle of approximately $2\alpha$. As noted above, the base 12 and the beams 14 are rigid. As such, they do not bend or otherwise deform when the structure 10 is transitioned from the expanded orientation to the contracted orientation, and vice versa. Instead, it is the flexible hinges 16, 18 that enable the structure 10 to transition between the two orientations.

As can be appreciated from comparison between FIGS. 1A and 1B, the bistable shape-reconfigurable structure 10 has a much smaller height while in the contracted orientation and, therefore, enables space savings while in that orientation. Notably, the structure 10 is stable in either orientation, meaning that the structure is will naturally remain in either orientation until a critical force is applied to the structure to transition it from its current orientation to the other orientation. Because the structure 10 is stable in two orientations, the structure 10 can be referred to as being "bistable." As noted above, the structure 10 is completely reversible so that it can be repeatedly placed in one stable orientation or the other, as desired.

It is noted that, in some embodiments, the bistable shape-reconfigurable structure 10 can be described as having a "stepped beam" design as it comprises a rigid base 12 and rigid beams 14 connected to the other components in the structure (i.e., another beam or the base) with living hinges 16, 18 at each end. This design significantly enhances the energy-absorption capacity and strength of the structure 10, as well as other structures and mechanisms that incorporate the structure. It is further noted that, because the structure 10 has a triangular shape (at least in the expanded orientation), it can be easily tessellated to form more complicated two-dimensional and three-dimensional structures and mechanisms.

Figure 2A:
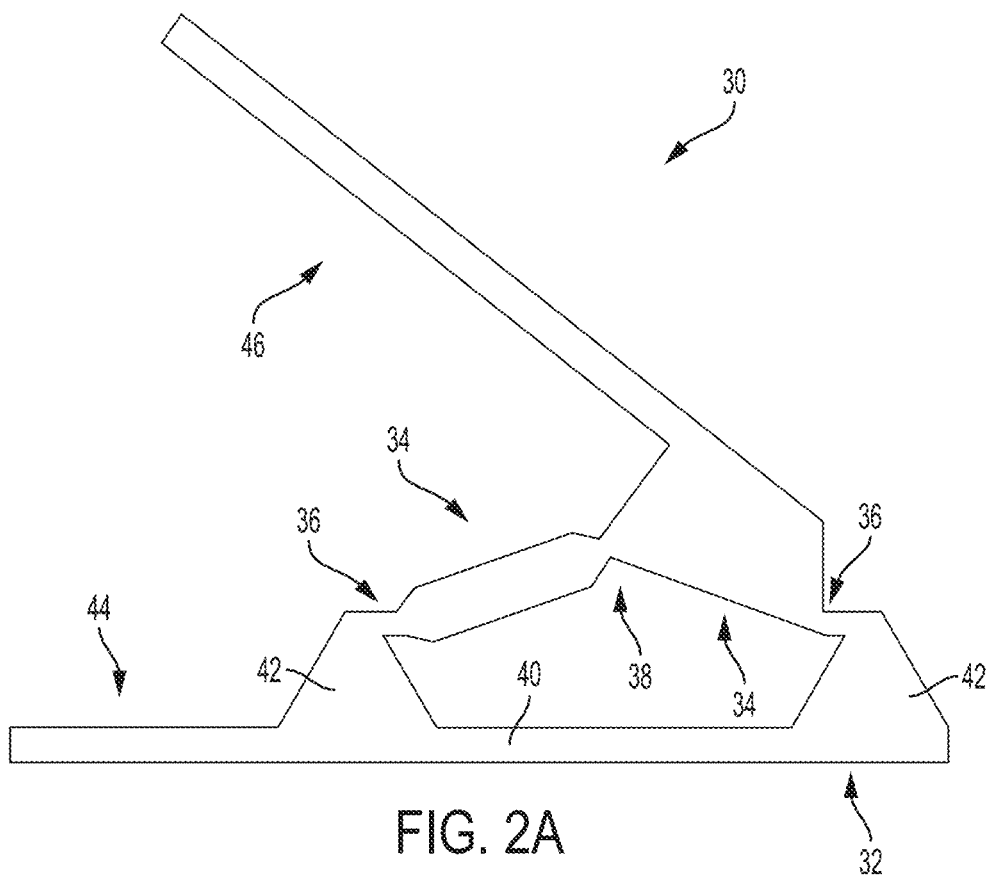
FIG. 2A is a side view of a second embodiment of a shape-reconfigurable structure, the structure shown in a first orientation.
Figure 2B:
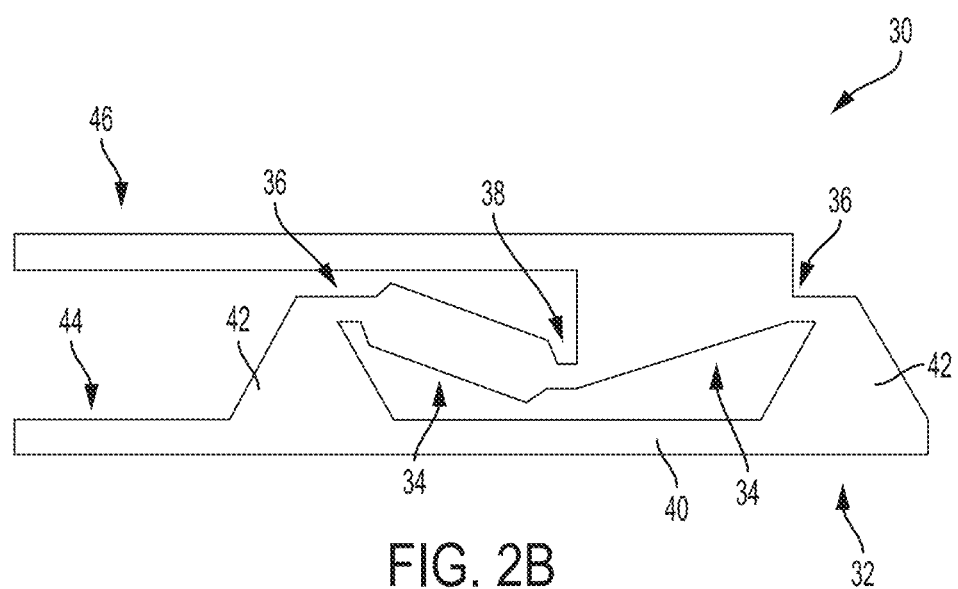
FIG. 2B is a side view of the shape-reconfigurable structure of FIG. 2A, the structure shown in a second orientation.

FIGS. 2A and 2B illustrate an alternative bistable shape-reconfigurable structure 30 that has a construction similar to that described above in relation to FIGS. 1A and 1B. Accordingly, the structure 30 also comprises a rigid base 32 and two rigid beams 34 that are connected to the base with lateral hinges 36 and to each other with a central hinge 38, each of being a flexible living hinge when the structure is unitarily formed from a single piece of material. The base 32 includes an elongated member 40 and spacer elements 42 provided at and extending vertically upward from each end of the member. Each of the beams 34 is of equal length but is shorter than the base 32. The ends of each beam 34 are tapered also to enable the structure 30 to collapse. In the embodiment of FIG. 2, however, the structure 30 further includes a first lever 44 that extends horizontally outward from the base along its longitudinal direction and a second lever 46 that extends outward from one of the beams 34 along its longitudinal direction in a manner in which both levers generally point to the same side of the structure. For instance, in the example of FIG. 2, the levers 44, 46 both point to the left side of the structure 30. As can be most easily appreciated from FIG. 2A, additional material can be provided at the point at which the lever 46 "connects" to its beam 34 to provide greater structural integrity. As the lever 46 and its beam 34 are made of the same material and therefore are actually the same component, this additional material can be considered to be part of the lever, part of the beam, or both.

The bistable shape-reconfigurable structure 30 can be operated in similar manner to the bistable shape-reconfigurable structure 10 of FIG. 1, except that the structure can be contracted from the expanded orientation shown in FIG. 2A to the contracted orientation shown in FIG. 2B using the levers 44, 46. More particularly, one or both of the levers 44, 46 can be moved toward the other lever so as to cause the beams 34 to collapse inward toward the base 32. As can be appreciated from FIG. 2B, the levers 44, 46 can be generally parallel to each other when the structure 30 is in the contracted orientation.

Figure 3A:
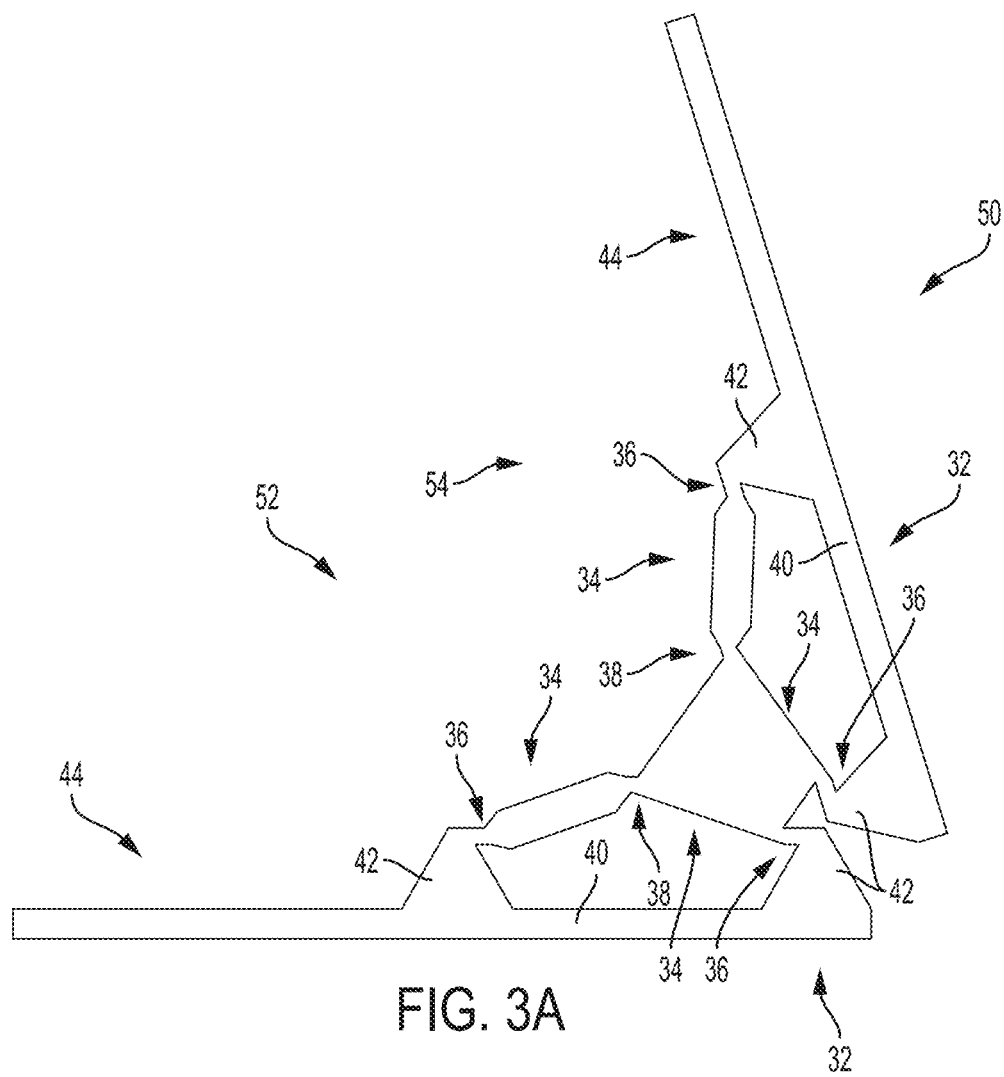
FIG. 3A is a side view of a third embodiment of a shape-reconfigurable structure, the structure shown in a first orientation.
Figure 3B:
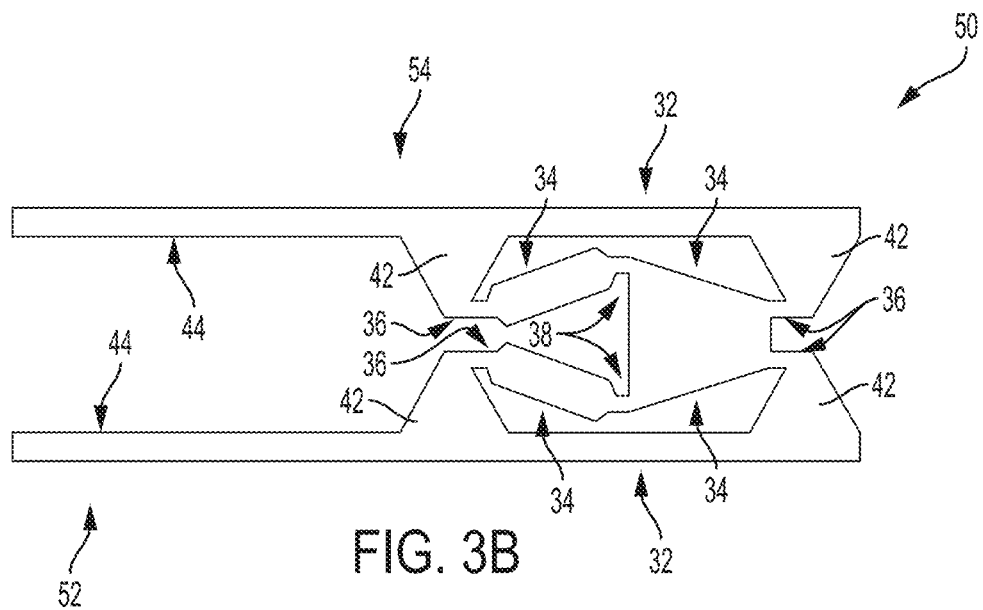
FIG. 3B is a side view of the shape-reconfigurable structure of FIG. 3A, the structure shown in a second orientation.

Bistable shape-reconfigurable structures of the types shown in FIGS. 1 and 2 can be combined with other bistable shape-reconfigurable structures of the same or different configuration to form multistable shape-reconfigurable structures and mechanisms. FIGS. 3A and 3B show an example of a multistable shape-reconfigurable structure 50 that comprises two connected bistable shape-reconfigurable structures. More particularly, the structure 50 comprises a first bistable shape-reconfigurable structure 52 and a second bistable shape-reconfigurable structure 54. Each of these bistable shape-reconfigurable structures 52, 54 has a construction similar to the bistable shape-reconfigurable structure 30 of FIG. 2, except that each omits the second lever 46 (see FIG. 2). As indicated in FIG. 3, the two bistable shape-reconfigurable structures 52, 54 are "connected" such that the beams 34 farthest from the levers 44 are connected together. In some embodiments, these two beams 34, as well as the remainder of the structure 50, can also be unitarily formed from a single piece of material. As can be most easily appreciated from FIG. 3A, the portion of the structure 50 that forms the two "connected" beams is relatively thick to provide enough space for the adjacent ends of the structures 52, 54.

As shown in FIG. 3B, the bistable shape-reconfigurable structures 52, 54 can be contracted to fully collapse the entire multistable shape-reconfigurable structure 50 to greatly reduce the space that the structure occupies. Notably, each of the structures 52, 54 can be independently contracted as desired.

Figure 4A:
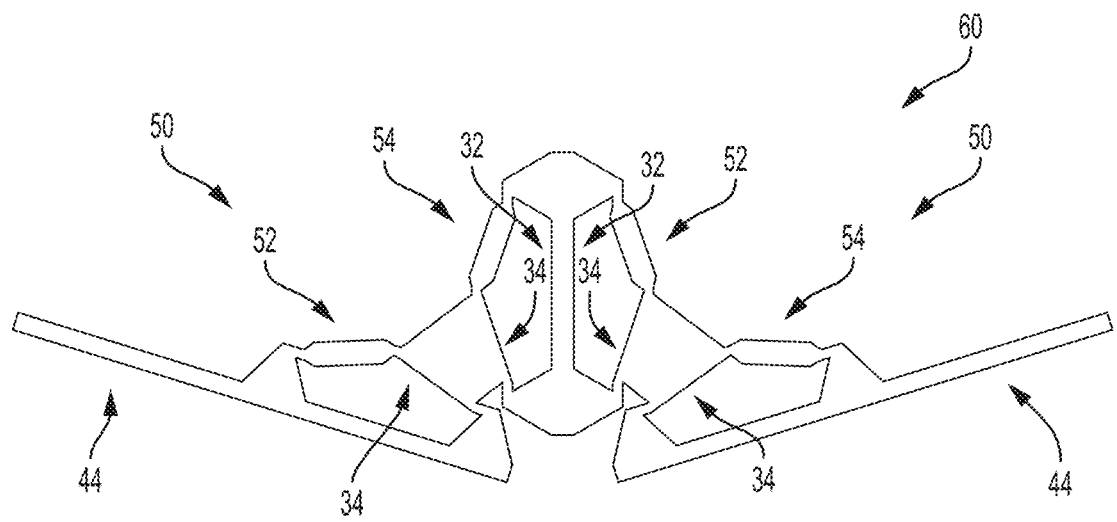
FIG. 4A is a side view of a fourth embodiment of a shape-reconfigurable structure, the structure shown in a first orientation.
Figure 4B:
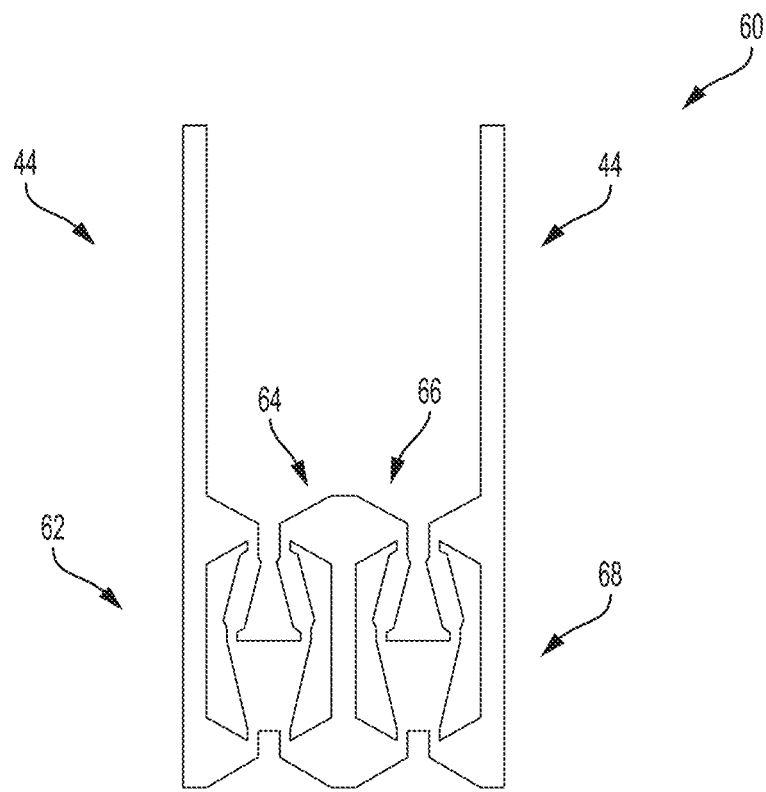
FIG. 4B is a side view of the shape-reconfigurable structure of FIG. 4A, the structure shown in a second orientation.

FIGS. 4A and 4B illustrate another example multistable shape-reconfigurable structure 60. In this case, the structure 60 generally combines two multistable shape-reconfigurable structures 50 shown in FIG. 3. In the structure 60, however, each of the structures 50 omit one of the levers 44. The two structures 50 are connected together such that the bistable shape-reconfigurable structure 54 of the first structure 50 is connected to the bistable shape-reconfigurable structure 52 of the second structure 50. More particularly, the base 32 of the bistable shape-reconfigurable structure 54 of the first structure 50 is connected to (or shared with) the base 32 of the bistable shape-reconfigurable structure 52 of the second structure 50. With this configuration, the structure 60 comprises four bistable shape-reconfigurable structures 52, 54. As with the previously described multistable shape-reconfigurable structure 50, the individual bistable shape-reconfigurable structures 62-68 of the structure 60 can be independently contracted as desired. FIG. 4A shows each of the bistable shape-reconfigurable structures 62-68 in the expanded orientation and FIG. 4B shows each of the bistable shape-reconfigurable structures in the contracted orientation.

Figure 5A:
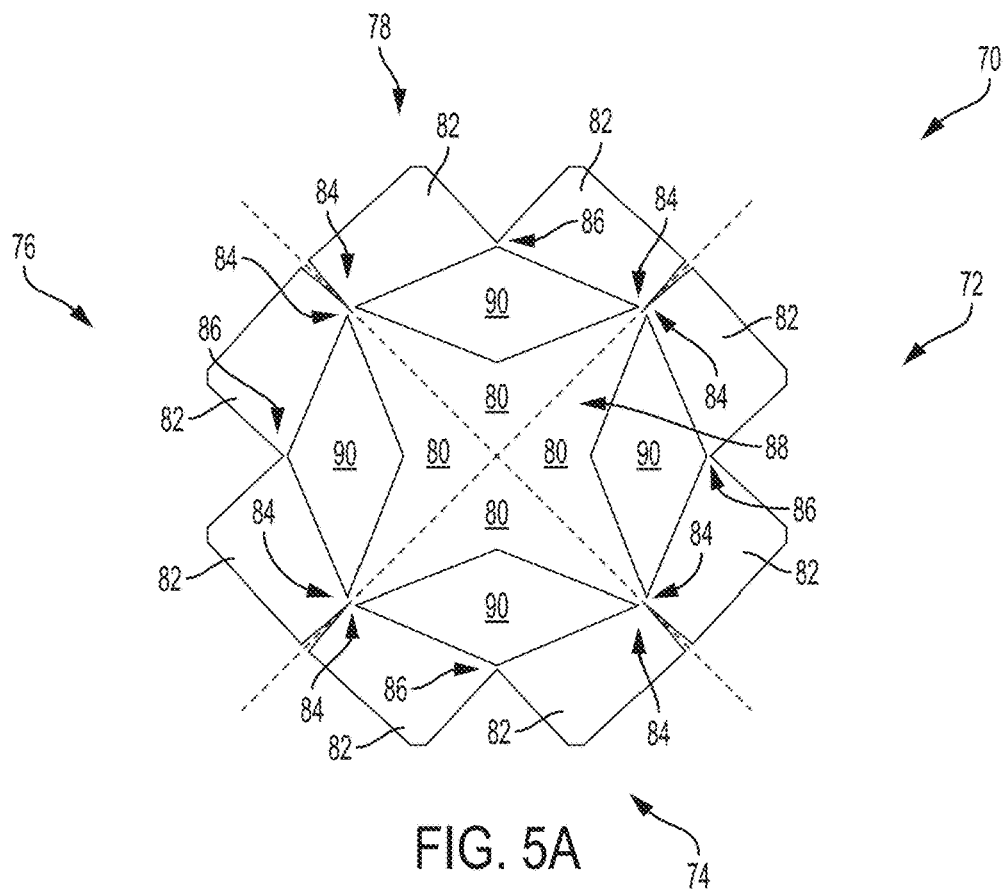
FIG. 5A is a side view of a fifth embodiment of a shape-reconfigurable structure, the structure shown in a first orientation.
Figure 5B:
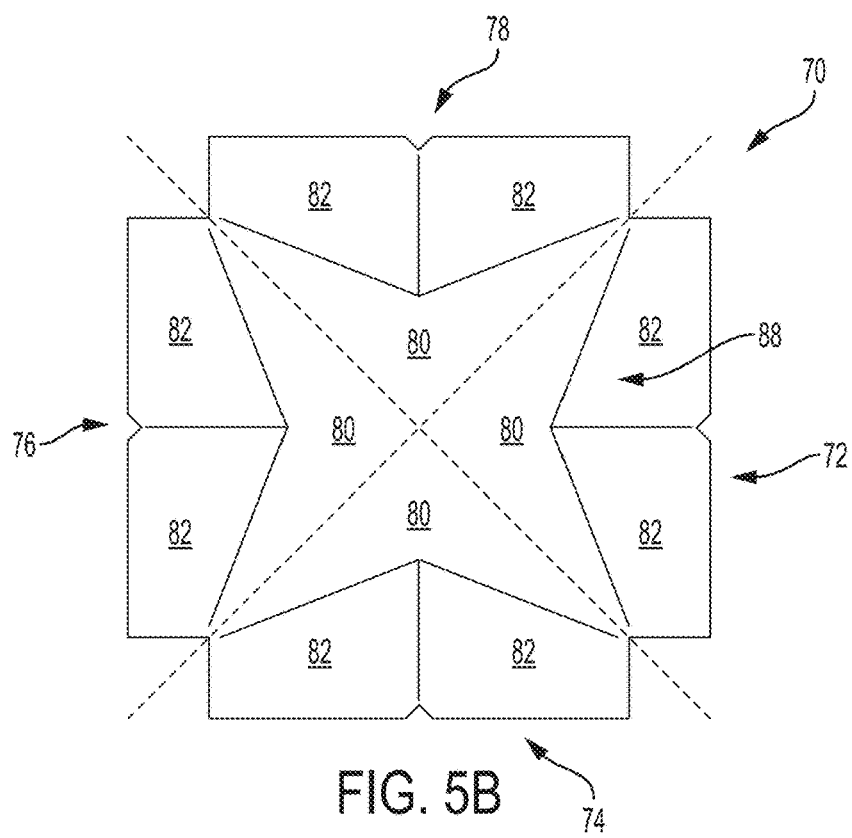
FIG. 5B is a side view of the shape-reconfigurable structure of FIG. 5A, the structure shown in a second orientation.

FIGS. 5A and 5B illustrate a further example multistable shape-reconfigurable structure 70. In this case, the structure 70 combines bistable shape-reconfigurable structures similar to the bistable shape-reconfigurable structure 10 of FIG. 1. More particularly, as indicated in FIG. 5A, the structure 70 includes four bistable shape-reconfigurable structures 72-78 that can be independently expanded or contracted, which are demarcated by the dashed lines in the figure. Each of these structures 72-78 includes a base 80 and beams 82 that are connected to the base with lateral hinges 84 and connected to each other with central hinges 86. As with the previously described embodiments, the structure 70 can be unitarily formed from a single piece of material, in which case the hinges 82, 84 are living hinges. As shown in FIG. 5A, the structure 70 generally forms a square having square-shaped notches at each corner of the square when the structure is in the fully expanded orientation (i.e., with each bistable shape-reconfigurable structure 72-78 in the expanded orientation).

As is apparent in FIG. 5A, the bases 80 of the bistable shape-reconfigurable structures 72-78 are "connected" to each other. When the multistable shape-reconfigurable structure 70 is made from a single piece of material, each of the bases 80 comprises a portion of a unitary central member 88 having a four-pointed star shape. This results in bases 80 that each have a V-shaped side that faces the beams 82. This V-shape provides space for the beams 82 when the structures 72-78 are in their contracted orientations shown in FIG. 5B.

Figure 6A:
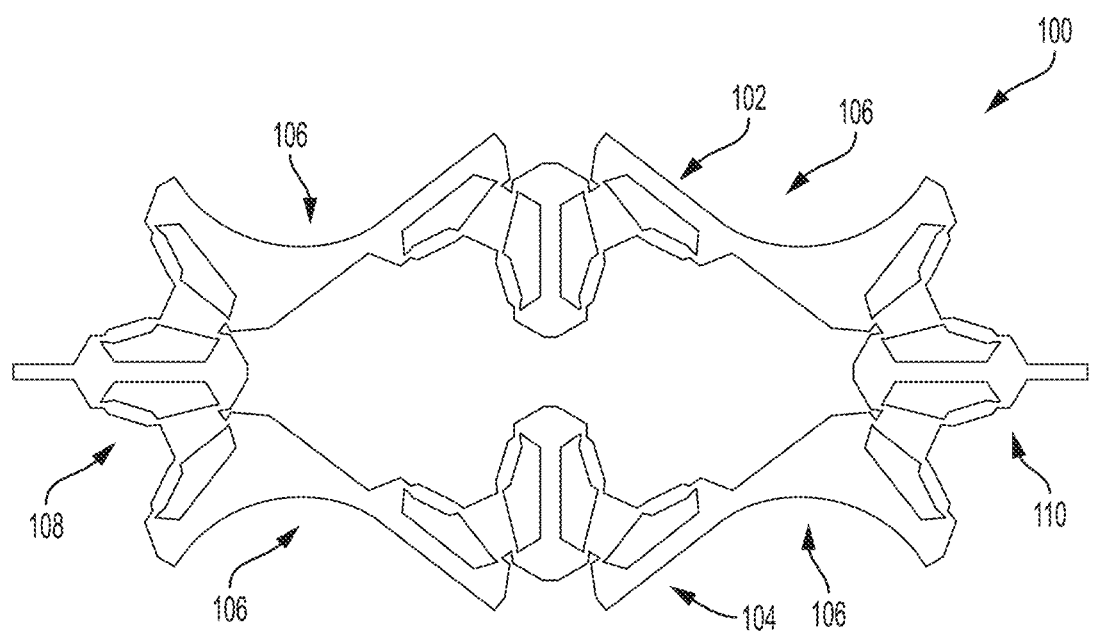
FIG. 6A is a side view of a first embodiment of a shape-reconfigurable mechanism, the mechanism shown in a first orientation.
Figure 6B:
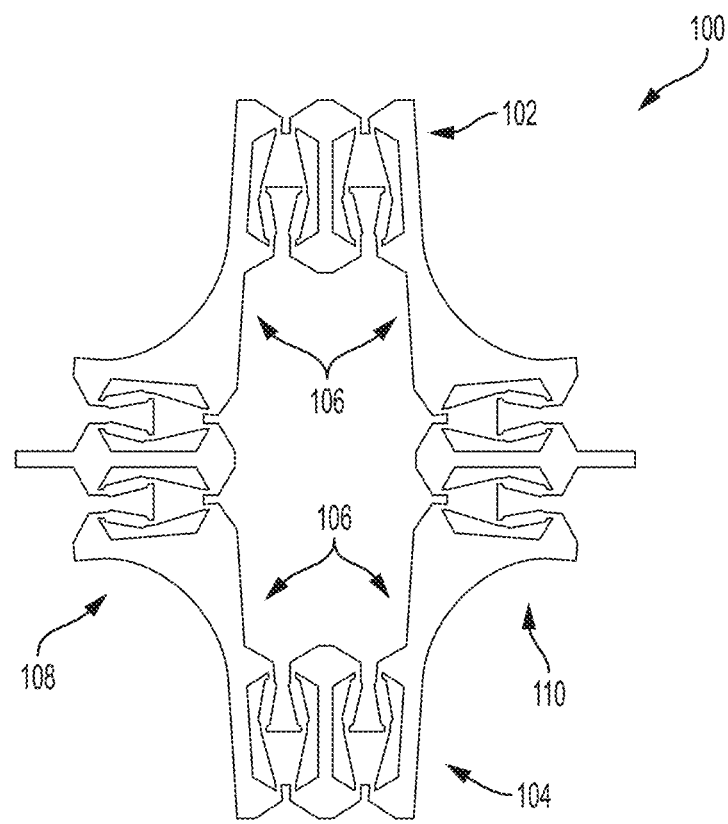
FIG. 6B is a side view of the shape-reconfigurable mechanism of FIG. 6A, the mechanism shown in a second orientation.

In the example of FIG. 5, the beams 82 of the bistable shape-reconfigurable structures 72-78 are quadrilaterals, comprised of an angled inner side that faces the base 80, two parallel lateral sides, and an outer side that is opposite to the inner side and perpendicular to the lateral sides. As shown in FIG. 5A, the V-shapes of the bases 80 and the inner sides of the beams 82 result in diamond-shaped spaces 90 being formed within each structure 72-78. These diamond-shaped spaces have two small angles of approximately $2\alpha$, as discussed before, and two large angles of approximately $180-2\alpha$. As shown in FIG. 5B, when the bistable shape-reconfigurable structures 72-78 are contracted, the inner sides of the beams 82 contact (or at least are positioned in close proximity to) the V-shaped sides of the bases such that the spaces 90 are occupied by the beams. As is apparent from FIG. 5B, when the outer sides of beams 82 are angled approximately $2\alpha$ with respect to the longitudinal axis of the diamond-shaped spaces 90, the multistable shape-reconfigurable structure 70 also forms a square having square-shaped notches at each corner when the structure is in the fully contracted orientation (i.e., with each structure 72-78 in the contracted orientation). This square, however, is much smaller than the square formed by the structure 70 when in the fully expanded orientation shown in FIG. 5A. Multistable shape-reconfigurable structures of the types described above can also be used as building blocks to design multi-degree-of-freedom, multistable shape-reconfigurable structures and mechanisms. FIGS. 6A and 6B illustrate an example of a multistable shape-reconfigurable mechanism 100 that is constructed using four multistable shape-reconfigurable structures. As shown in FIG. 6A, the mechanism 100 comprises first and second medial multistable shape-reconfigurable structures 102 and 104 of the type shown in FIG. 4. Like the multistable shape-reconfigurable structure 60 of FIG. 4, each multistable shape-reconfigurable structure 102, 104 comprises four bistable shape-reconfigurable structures that can be independently expanded or contracted. Both multistable shape-reconfigurable structures 102, 104 includes levers or arms 106 that extend laterally outward in similar manner to the levers 44 shown in FIG. 4. One arm 106 from each multistable shape-reconfigurable structure 102, 104 connects to one of two end multistable shape-reconfigurable structures 108 and 110. More particularly, each of the arms 106 connects to one of the beams of a bistable shape-reconfigurable structure of one of the multistable shape-reconfigurable structures 108, 110. Notably, the multistable shape-reconfigurable structures 108, 110 each omit the levers 44 used in the multistable shape-reconfigurable structure 60 of FIG. 4. FIG. 6A shows each of the bistable shape-reconfigurable structures of the multistable shape-reconfigurable mechanism 100 in the expanded orientation and FIG. 4B shows each of the bistable shape-reconfigurable structures of the multistable shape-reconfigurable mechanism in the contracted orientation.

Figure 7:
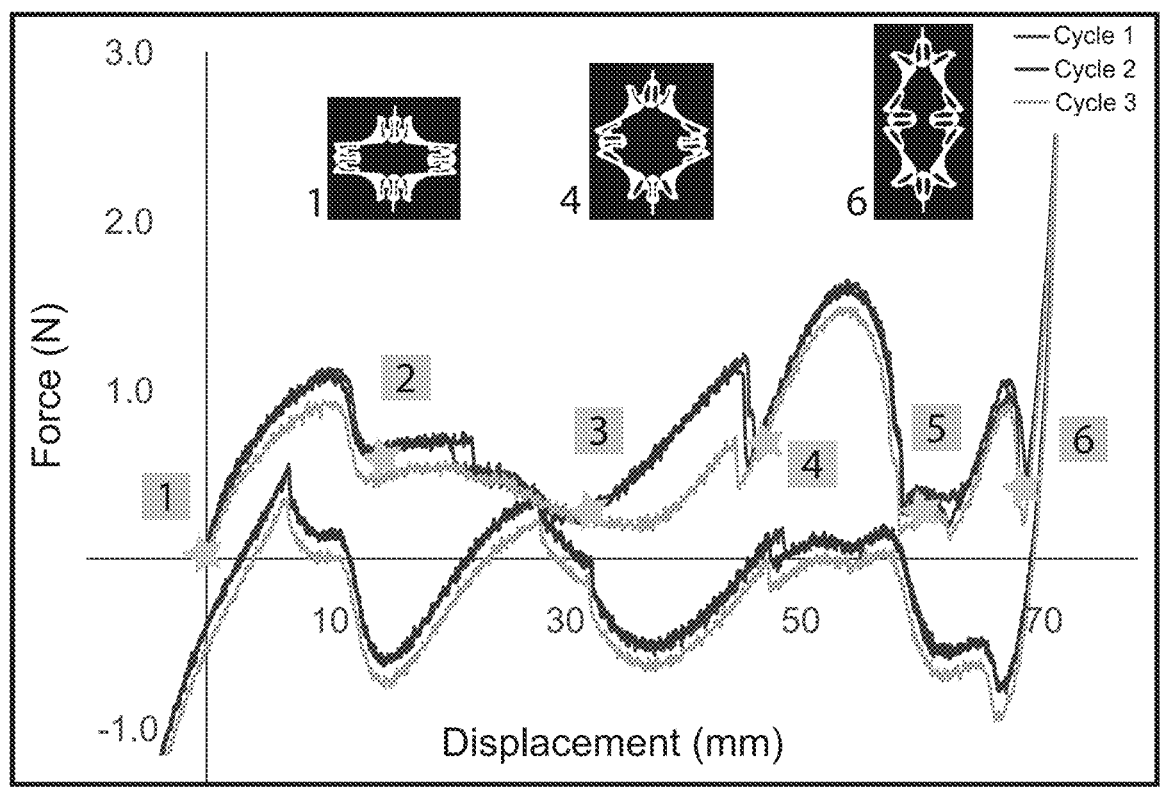
FIG. 7 is a graph that plots the force-displacement response for a shape-reconfigurable mechanism similar to that of FIG. 6 under quasi-static cyclic loading.

The multistable shape-reconfigurable mechanism 100 of FIG. 6 can be used as a linear extension unit with significant axial deformation range. Besides axial extension, a linear extension unit has two additional kinematic degrees of freedom (i.e., lateral movement and rotation). The load-displacement cyclic response of a linear extension unit with stretch ratio of $\lambda=1.75$ is shown in FIG. 7. This unit was fabricated in polytetrafluoroethylene (PTFE) by laser cutting. This architecture displays some unique mechanical characteristics. First, there is a wide range of stretch ($\Delta\lambda=1.6$) for which the applied load is almost constant (~1 N). At an extension of approximately 70 mm, the full extension is reached and the force increases dramatically thereafter. Second, the load-displacement response is non-reversible upon unloading, as is explained below, resulting in significant cyclic energy dissipation (~70 N·mm). Third, there are multiple stability points between the minimum and maximum expanded configurations, labeled from 1 to 6, at each of which the removal of loading will result in a stable position (i.e., zero load and a positive load displacement slope). When higher values of stretch ratio are desirable, the linear extension unit can be designed to include a higher total lever length.

Figure 8A:
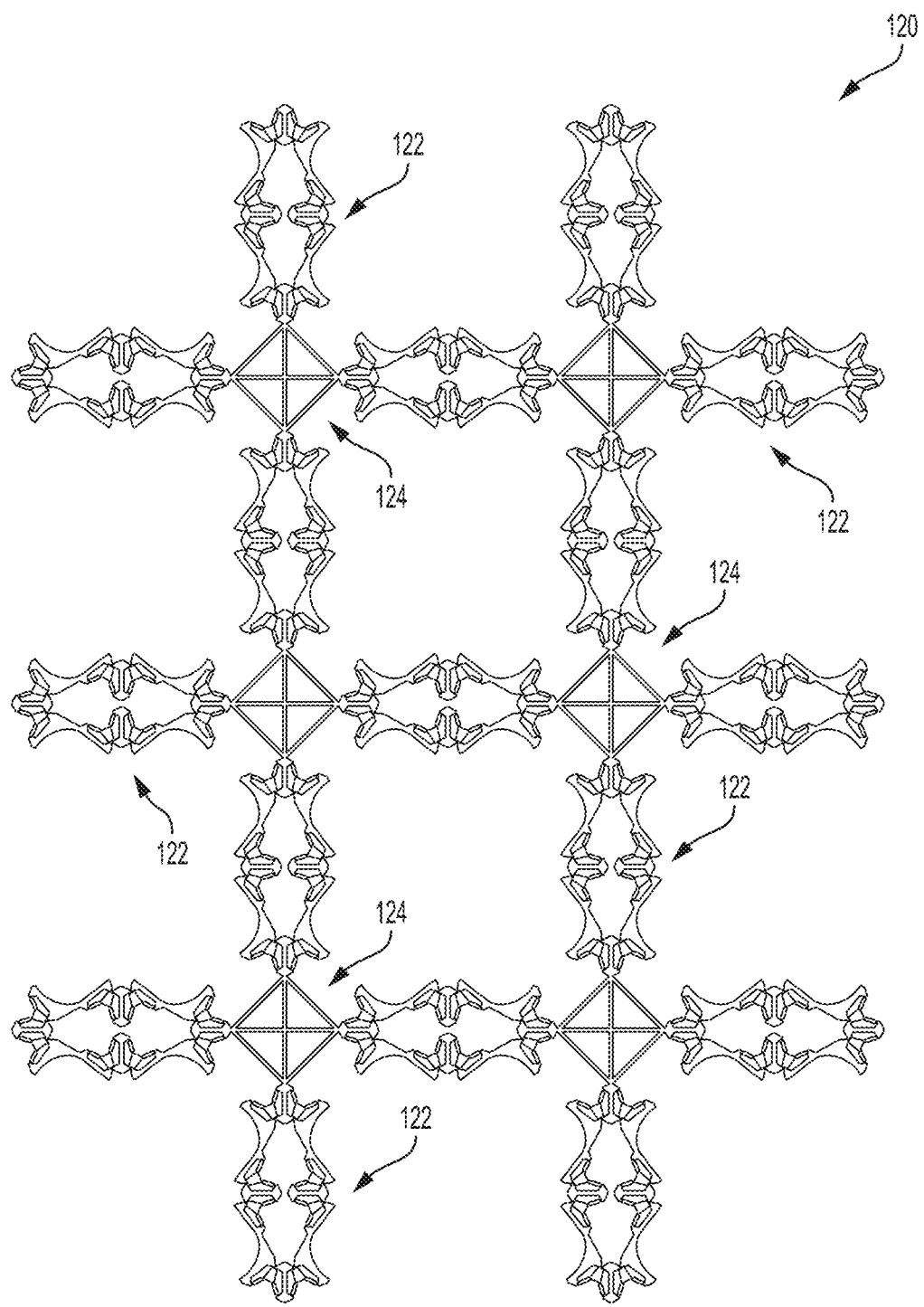
FIG. 8A is a side view of a second embodiment of a shape-reconfigurable mechanism, the mechanism shown in a first orientation.
Figure 8B:
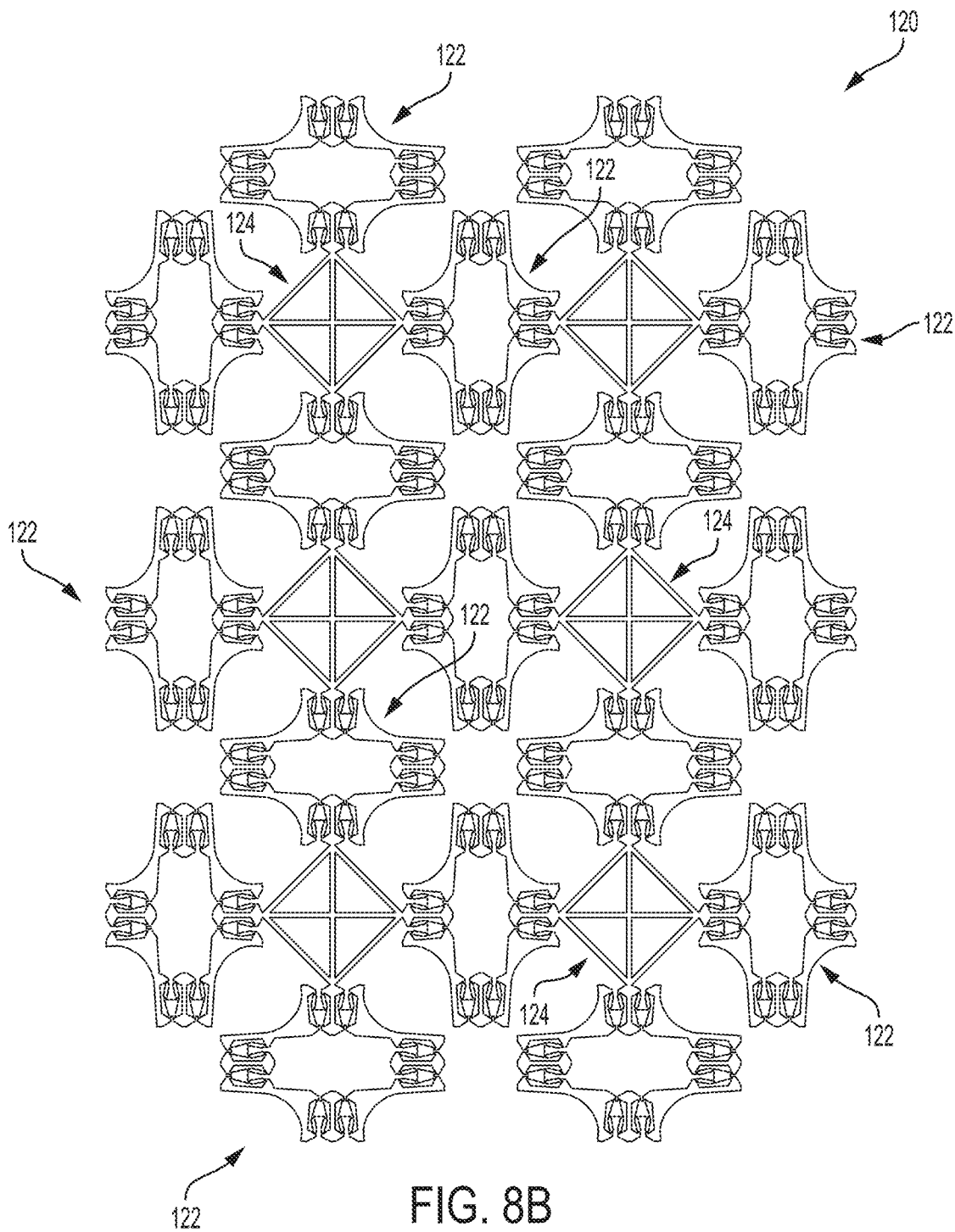
FIG. 8B is a side view of the shape-reconfigurable mechanism of FIG. 8A, the mechanism shown in a second orientation.

Multistable shape-reconfigurable mechanisms of the type described above can also be combined to form other, more complex multistable shape-reconfigurable mechanisms. FIGS. 8A and 8B show a multistable shape-reconfigurable mechanism 120 in fully expanded and fully contracted orientations, respectively. The mechanism 120 comprises a plurality of multistable shape-reconfigurable mechanisms 122 similar to the multistable shape-reconfigurable mechanism 100 (linear extension unit) shown in FIG. 6. As shown in FIG. 8A, the mechanisms 122 are configured in a periodic arrangement obtained by Cartesian tiling to form a rectangular array in which there are rows and columns of mechanisms connected to each other in series. The array includes central hubs 124. In the example shown in FIG. 8, four mechanisms 122 extend from each hub 124 in four different orthogonal directions (i.e., 0°, 90°, 180°, and 270°). In the illustrated embodiment, the hubs 124 are square but rotated 90° relative to the rows and columns so as to appear to have diamond shapes within the array. It is noted that the mechanism 100 can be placed in a range of stable deformed configurations beyond the fully expanded configuration of FIG. 8A and the fully contracted configuration of FIG. 8B. Specifically, through selective collapsing of individual bistable shape-reconfigurable structures and/or multistable shape-reconfigurable structures of the mechanism 120, the mechanism 100 can, for example, be manipulated to form various shapes, such as an O-shaped, a V-shaped, or an X-shaped structure.

Figure 9A:
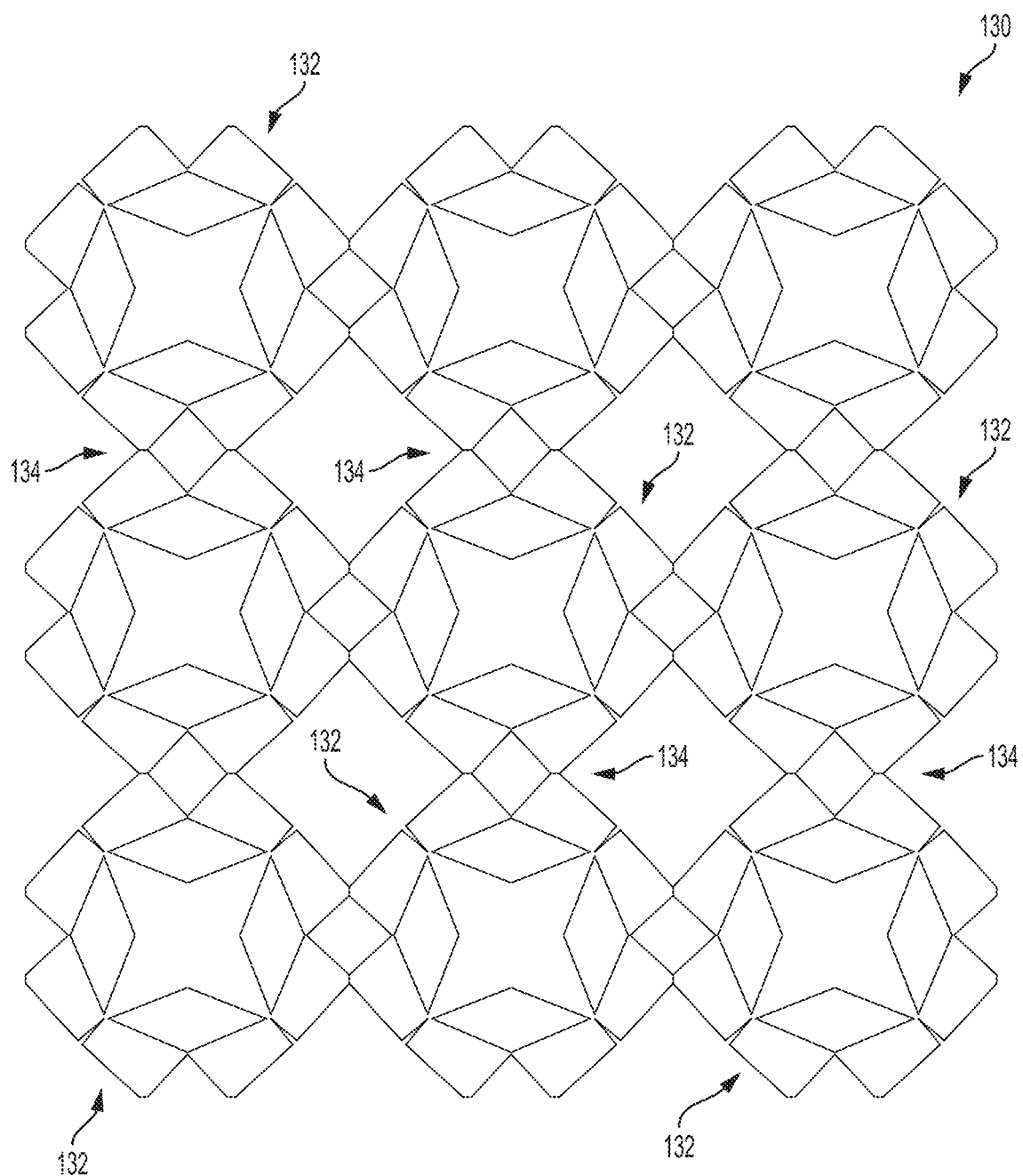
FIG. 9A is a side view of a third embodiment of a shape-reconfigurable mechanism, the mechanism shown in a first orientation.
Figure 9B:
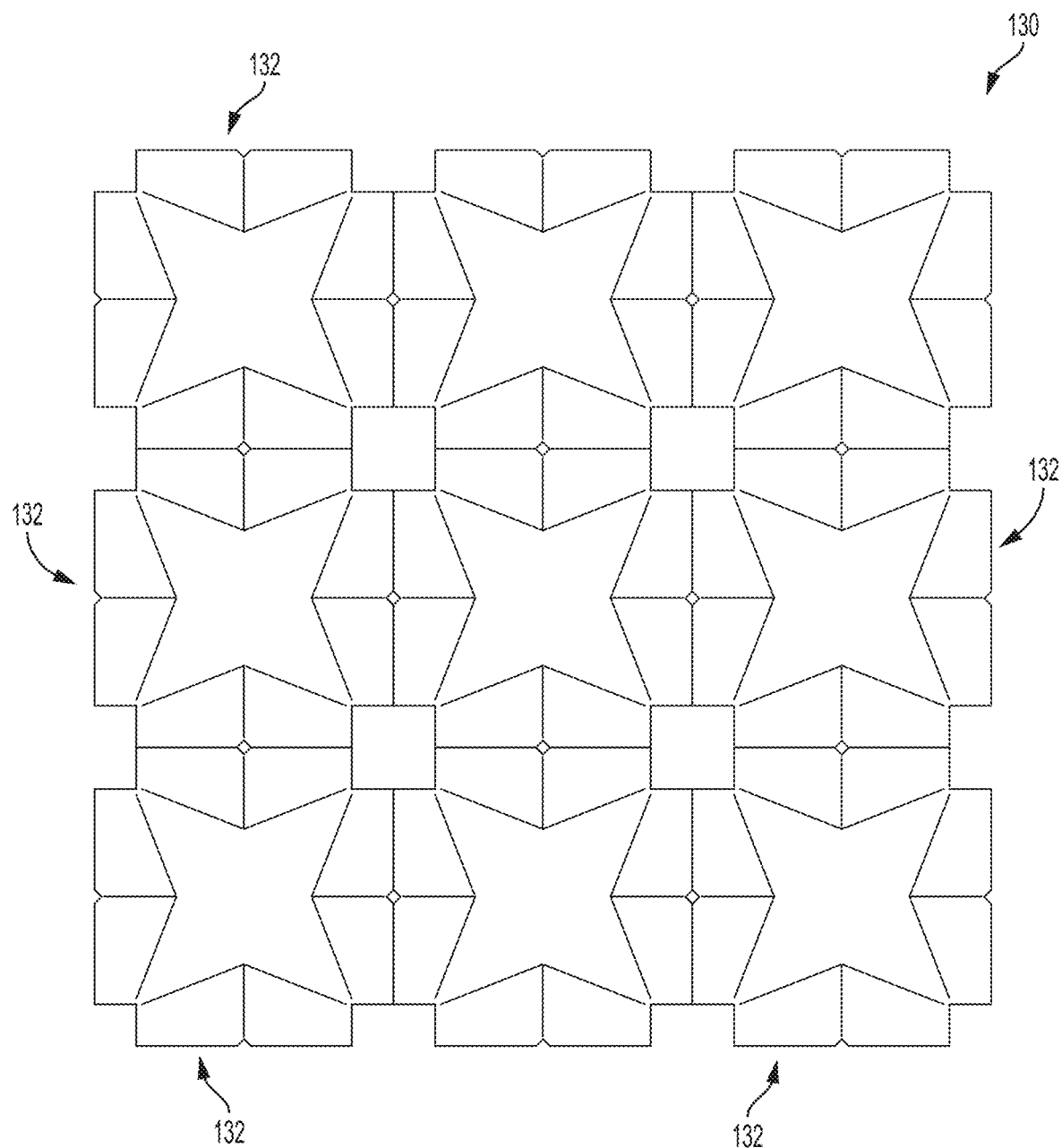
FIG. 9B is a side view of the shape-reconfigurable mechanism of FIG. 9A, the mechanism shown in a second orientation.

FIGS. 9A and 9B illustrate a further multistable shape-reconfigurable mechanism 130. This mechanism 130 comprises multiple multistable shape-reconfigurable structures 132 similar to the multistable shape-reconfigurable structure 70 of FIG. 5. In the example of FIG. 9, each of these structures 132 is connected to at least two other structures 132. In particular, the outer corners of the central ends of the beams of the structures 132 are connected to the outer corners of the central ends of the beams of adjacent structures 132 with further hinges 134 to form a rectangular array of rows and columns of structures connected to each other in series. Notably, the hinges 134 differ from the hinges 84, 86 of the individual structures 132 (see FIG. 5) as the hinges 134 are not snap-through hinges and simply flex during expansion and contraction of the mechanism 130. Because of this, the hinges 134 bear different loads and their configurations (e.g., thicknesses) can be different from those of the hinges 16, 18. FIG. 9A shows the mechanism 130 in the fully expanded orientation and FIG. 9B shows the mechanism in the fully contracted orientation.

Figure 10:
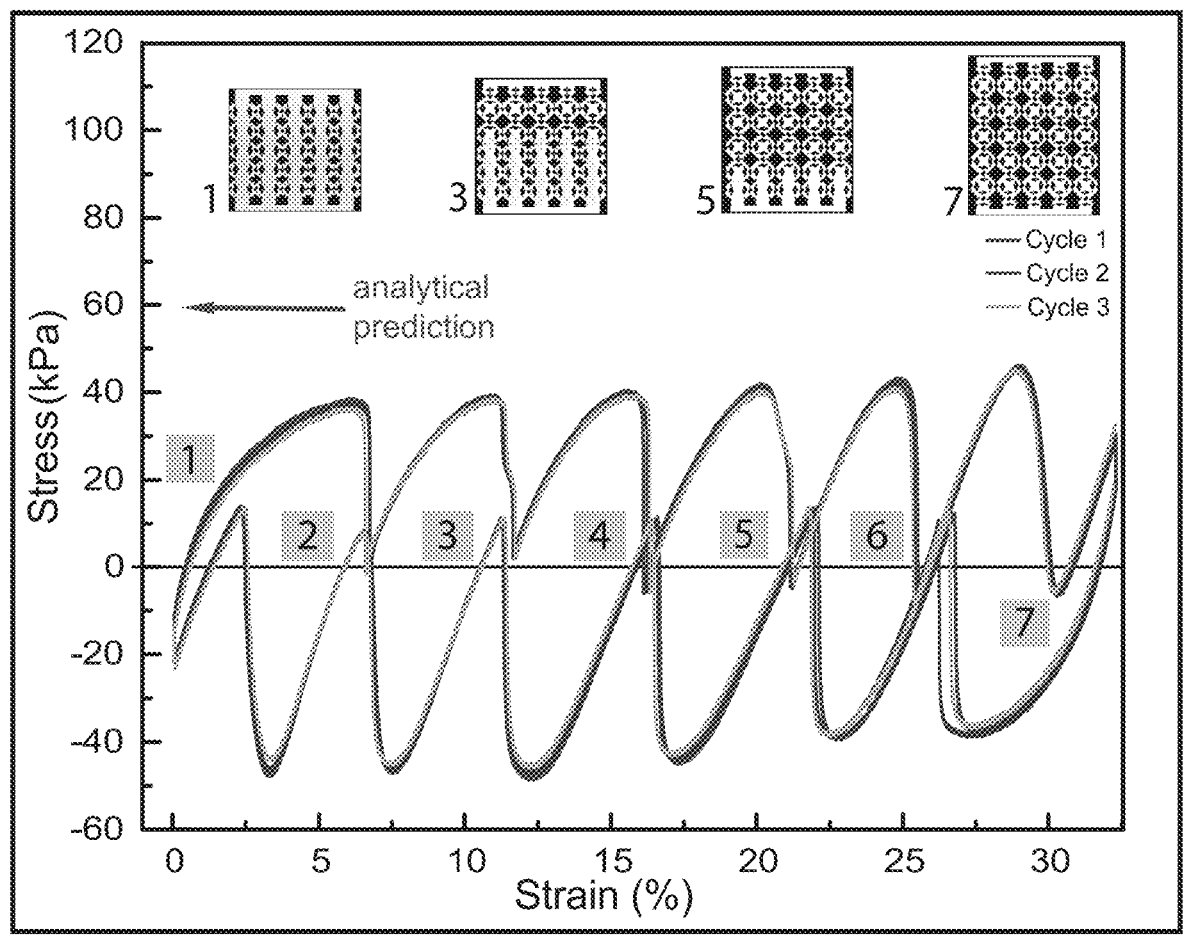
FIG. 10 is a graph that plots the force-displacement response for a 5×5 shape-reconfigurable mechanism similar to that of FIG. 9.

In some cases, the general objective for the multistable shape-reconfigurable mechanisms is to obtain a significant amount of deformation with relatively small applied loads. However, in energy absorption applications or when the shape reconfigurable structure is load-bearing, higher values of strength may be desirable. The multistable shape-reconfigurable mechanism 130 of FIG. 9 exhibits high-strength. The load-displacement cyclic response of a 5×5 prototype having a construction similar to the mechanism shown in FIG. 9 was fabricated having a stretch ratio of $\lambda=1.37$. As shown in FIG. 10, the prototype mechanism had a significant hysteresis area and six load drops of roughly equivalent magnitudes. An estimation of the snap-through strength of the periodic material from analytical methods (discussed below) is also shown in FIG. 10.

Figure 11A:
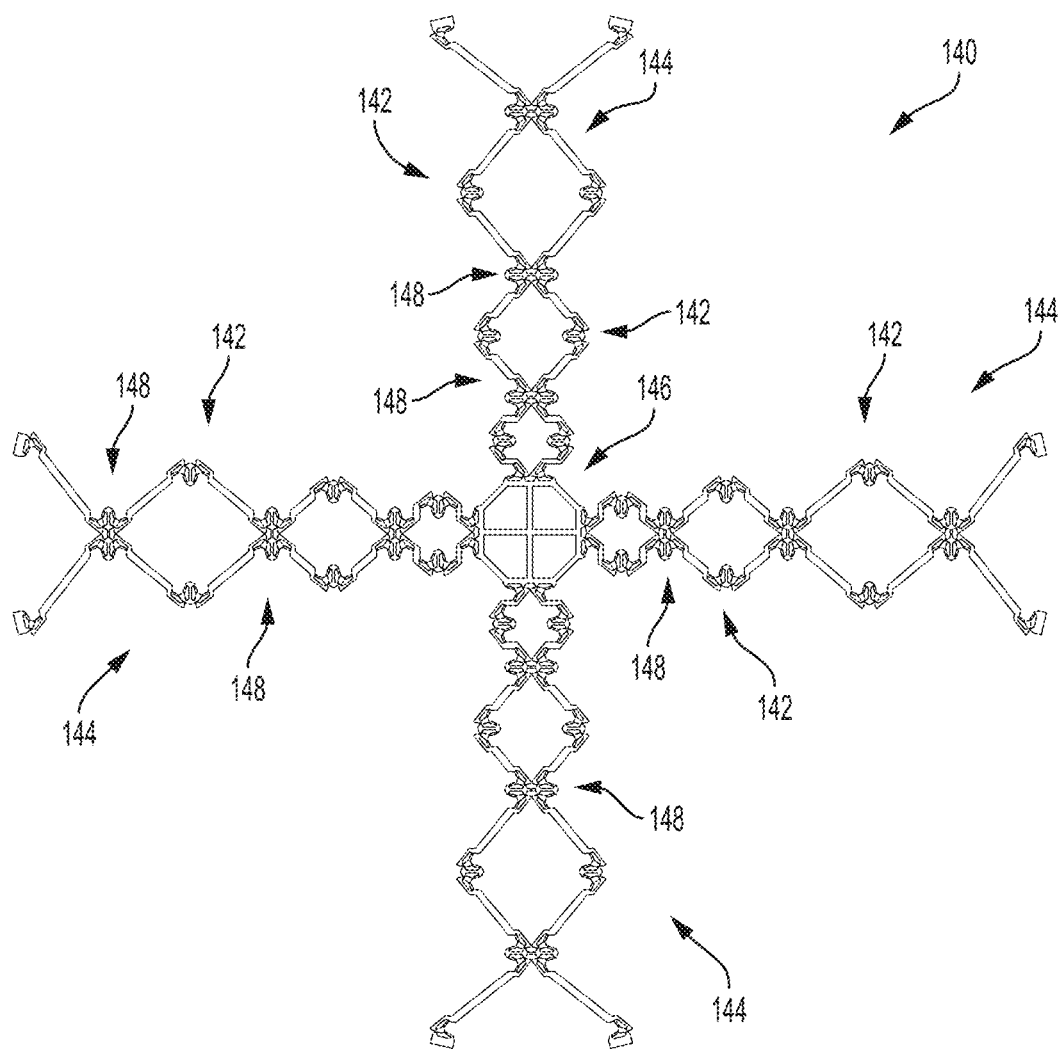
FIG. 11A is a side view of a fourth embodiment of a shape-reconfigurable mechanism, the mechanism shown in a first orientation.
Figure 11B:
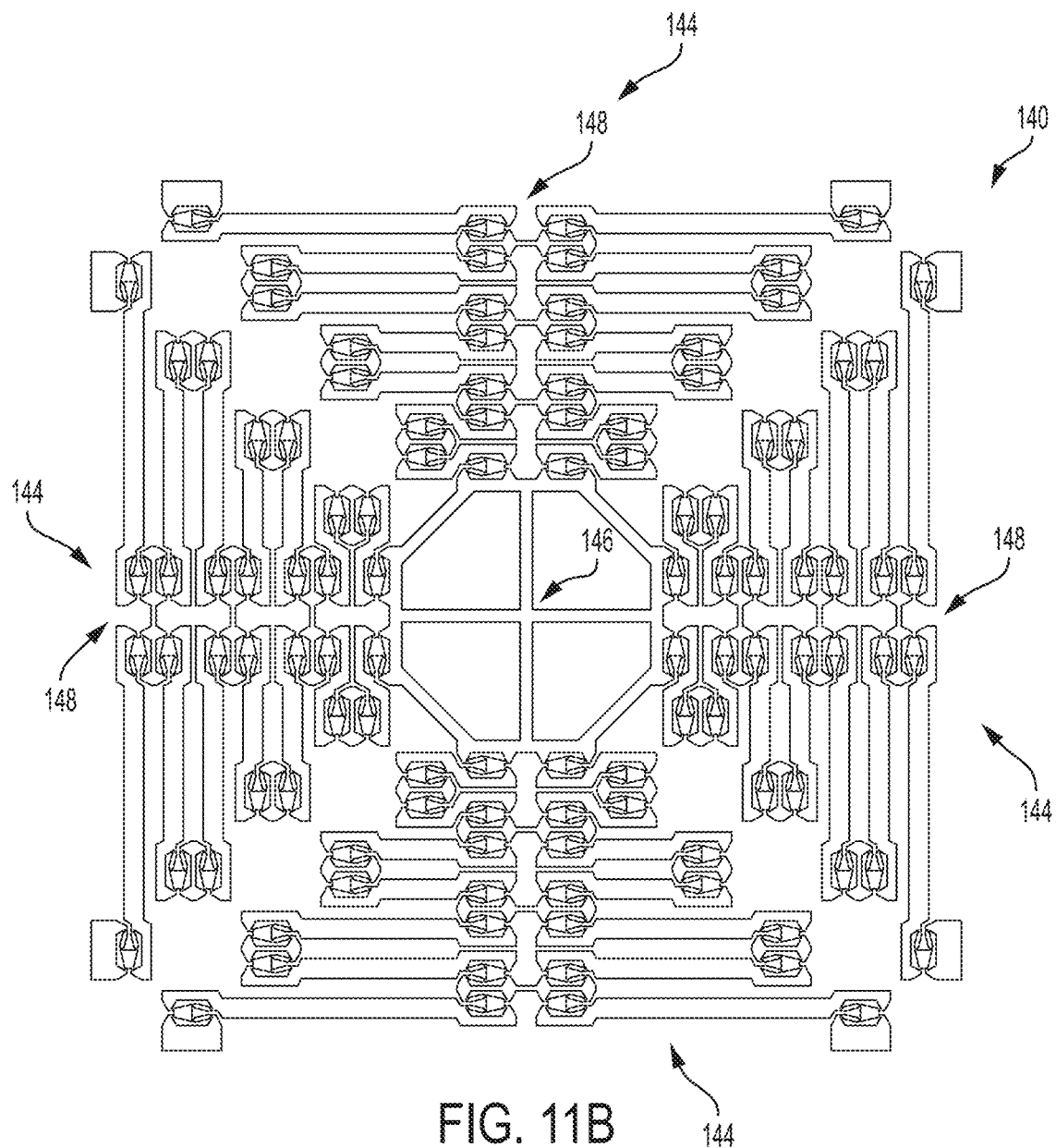
FIG. 11B is a side view of the shape-reconfigurable mechanism of FIG. 11A, the mechanism shown in a second orientation.

FIGS. 11A and 11B show a further example of a multistable shape-reconfigurable mechanism 140 in fully expanded and fully contracted orientations, respectively. Like the multistable shape-reconfigurable mechanism 100 of FIG. 6, the mechanism 140 comprises a plurality of multistable shape-reconfigurable structures 142 similar to the multistable shape-reconfigurable structure 60 of FIG. 4. As shown in FIG. 11A, the structures 142 are arranged in series along four arms 144 of the mechanism 140, which each arm extends outwardly from a central hub 146 in four different orthogonal directions. Each structure 142 is connected to the next structure in the series with a further multistable shape-reconfigurable structure 148 that each comprises two multistable shape-reconfigurable structures similar to the shape-reconfigurable structure 60 of FIG. 4 facing opposite directions and being connected by two oppositely facing bistable shape-reconfigurable structures similar to the bistable shape-reconfigurable structure 10 of FIG. 1. The structures 142 are also arranged in parallel with each other along each arm 144 as each structure 142 has a corresponding structure 142 of similar construction positioned across from it along the arm. The mechanism 140 exhibits a relatively large stretch ratio. For example, the mechanism 140 can have a stretch ratio of $\lambda=3.5$.

Figure 12:
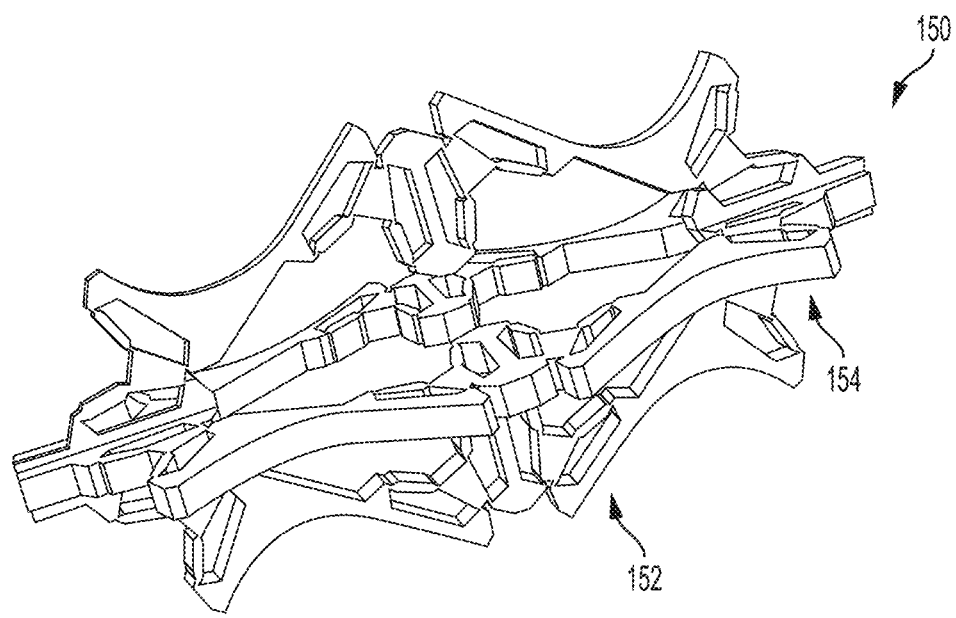
FIG. 12 is a perspective view of a first embodiment of a three-dimensional shape-reconfigurable mechanism.

The above-described structures and mechanisms are all two-dimensional. These structures and mechanisms can, however, be used to form three-dimensional multistable shape-reconfigurable mechanisms. FIG. 12 shows an example three-dimensional multistable shape-reconfigurable mechanism 150. As can be appreciated from this figure, the mechanism 150 comprises two orthogonally arranged multistable shape-reconfigurable mechanisms similar to the multistable shape-reconfigurable mechanism 100 of FIG. 6. More particularly, the mechanism 150 comprises a first multistable shape-reconfigurable mechanism 152 that is 90° out of phase of a second multistable shape-reconfigurable mechanism 154. By using two joined and aligned two-dimensional multistable shape-reconfigurable mechanisms 152, 154 arranged in two perpendicular planes, the two additional degrees of freedom can be suppressed and a unit cell is obtained that can only stretch in the axial direction.

Figure 13:
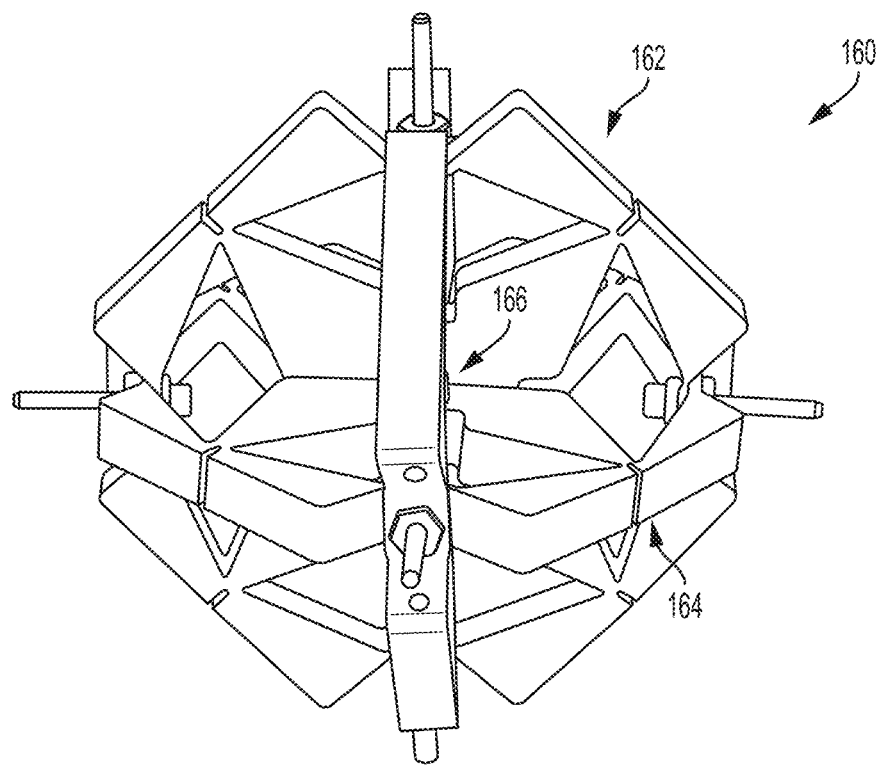
FIG. 13 is a perspective view of a second embodiment of a three-dimensional shape-reconfigurable mechanism.

FIG. 13 shows another three-dimensional multistable shape-reconfigurable mechanism 160. As can be appreciated from this figure, the mechanism 160 comprises three mutually orthogonal multistable shape-reconfigurable structures similar to the multistable shape-reconfigurable structure 70 of FIG. 5. More particularly, the mechanism 160 comprises a first structure 162 that is 90° out of phase of a second structure 164, and a third structure 166 that is 90° out of phase of both the first structure 162 and the second structure 164.

Figure 14:
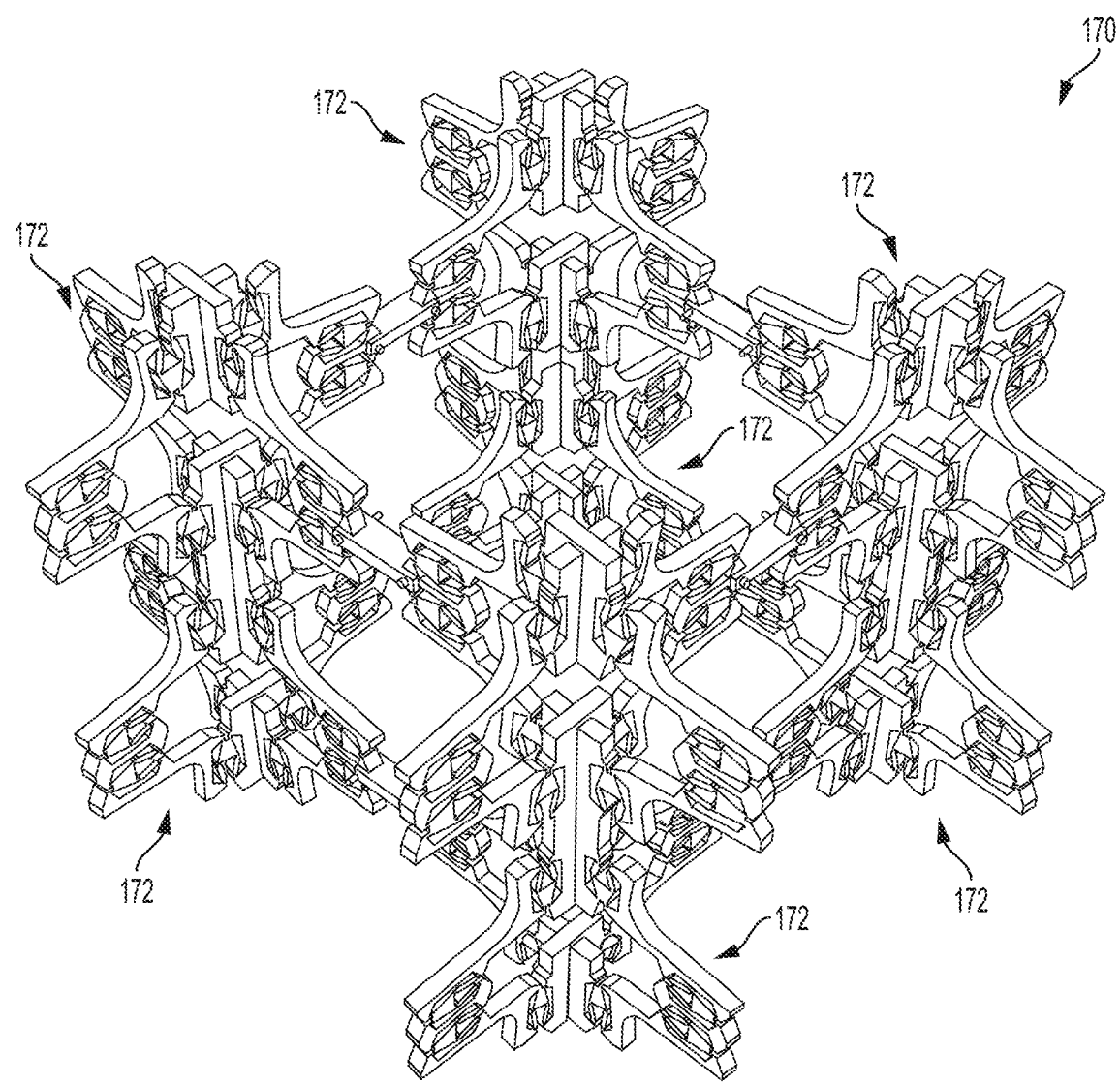
FIG. 14 is a perspective view of a third embodiment of a three-dimensional shape-reconfigurable mechanism.
Figure 15:
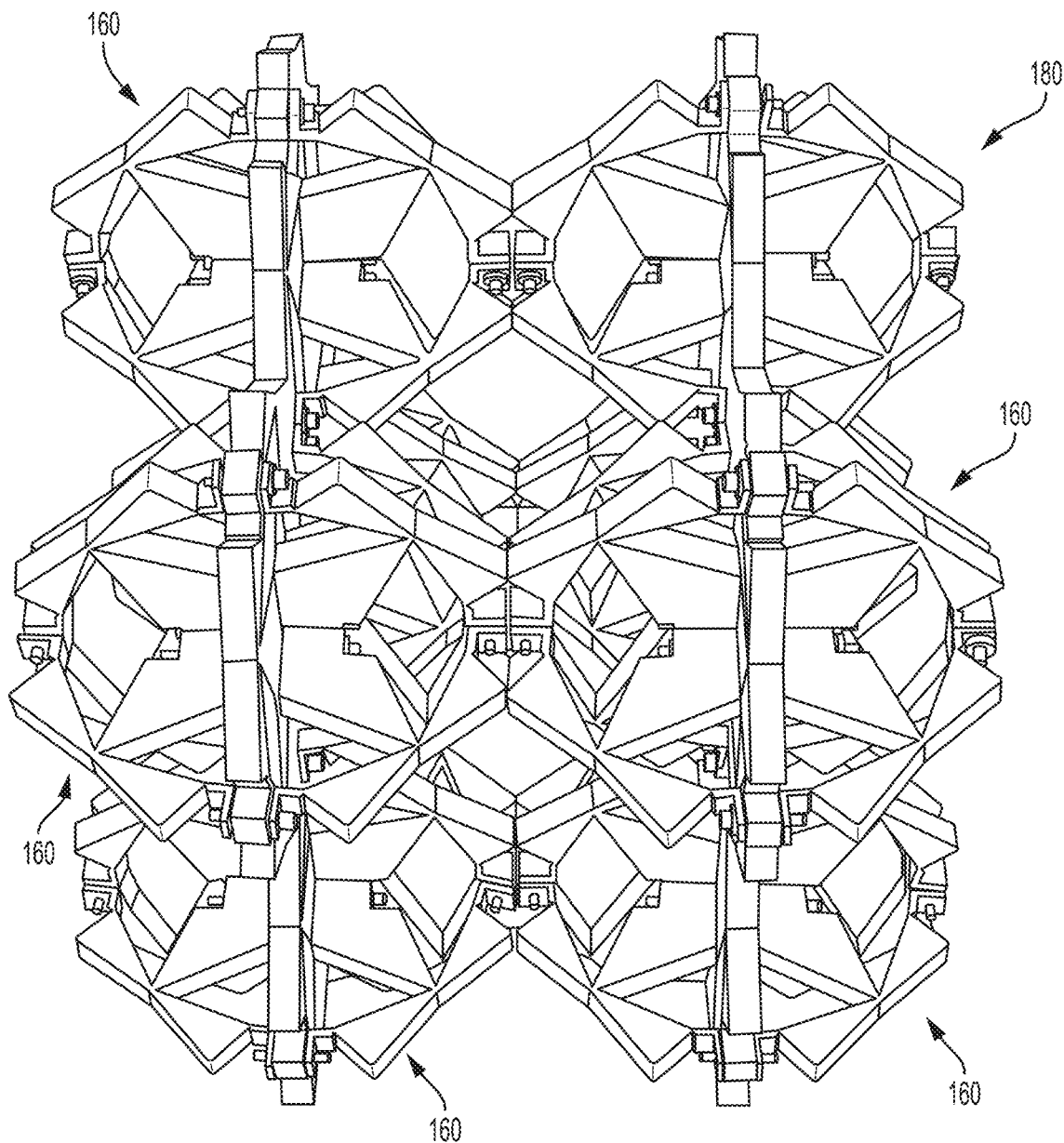
FIG. 15 is a perspective view of a fourth embodiment of a three-dimensional shape-reconfigurable mechanism.

Three-dimensional multistable shape-reconfigurable mechanisms of greater complexity can be formed using repeated, smaller three-dimensional multistable shape-reconfigurable mechanisms. As an example, FIG. 14 shows a three-dimensional multistable shape-reconfigurable mechanism 170 that comprises a plurality of three-dimensional multistable shape-reconfigurable mechanisms 172 similar to the three-dimensional multistable shape-reconfigurable mechanism 150 of FIG. 12 arranged in a three-dimensional array having multiple planes, each plane including rows and columns of mechanisms 172. As a further example, FIG. 15 shows a three-dimensional multistable shape-reconfigurable mechanism 180 that comprises a plurality of three-dimensional multistable shape-reconfigurable mechanisms 182 similar to the three-dimensional multistable shape-reconfigurable mechanism 160 of FIG. 13 arranged in a three-dimensional array having multiple planes, each plane including rows and columns of mechanisms 182. A prototype of this mechanism 180 was fabricated having an axial contraction ratio of $\lambda=1.4$.

The ability to capture the load-displacement response of multistable structures and mechanisms with analytical or numerical models is essential for design activities. Such a response can be obtained from the mechanical behavior of its constituent bistable shape-reconfigurable structures (i.e., triangular units), such as that shown in FIG. 1. The problem of a bistable triangular unit under vertical force can, in turn, be reduced to the response of an inclined guided beam restrained between two vertical walls because the reflection symmetry of the unit is about the vertical center line and also the fact that the triangle base is relatively rigid and thus cannot bend or stretch. An analytical method was used in a study to obtain the load-displacement response of inclined guided beams with living hinges based on the beam-deflection method, which provided great insight on the underlying physics at different stages of response of the bistable element with non-convex elastic energy. The analytical method divided the overall deflection and axial shrinkage of the beam into three deflection modes, namely axial stretching, symmetric bending, and asymmetric bending.

Analysis has revealed that the load-displacement response of a uniform inclined guided beam follows five consecutive stages, as shown in 16A. In the first stage, the beam is subjected to purely axial compression due to the stretching dominated static and a kinematic response of the structure under small deformations. This behavior is nearly linear. In general, this stage is abruptly ended at the critical load of $4\pi^2 \sin\alpha$, where the structure suddenly buckles into the well-known problem of a column with two fixed ends under axial compression. During this second stage, the load-displacement response has a negative slope (spinodal phase) and the deformation is almost purely symmetric. In stage three, the deformation is a combination of symmetric and asymmetric components and the slope is negative (cont. spinodal phase). In stage four, the symmetric component of deformation disappears, and the response takes a positive slope again. Finally in stage five, the behavior becomes purely stretching dominated. If the thickness to length ratio of the hinges is sufficiently large, the symmetric buckling strength of the inclined beams is higher than the maximum axial load induced in the beams during the snap-through and no bifurcation in the load-displacement response is observed. In this case, the load-displacement response comprises only three stages and the slope changes continuously during the transitions from axial compression to asymmetric deformation and from asymmetric deformation to axial stretching.

Figure 16A:
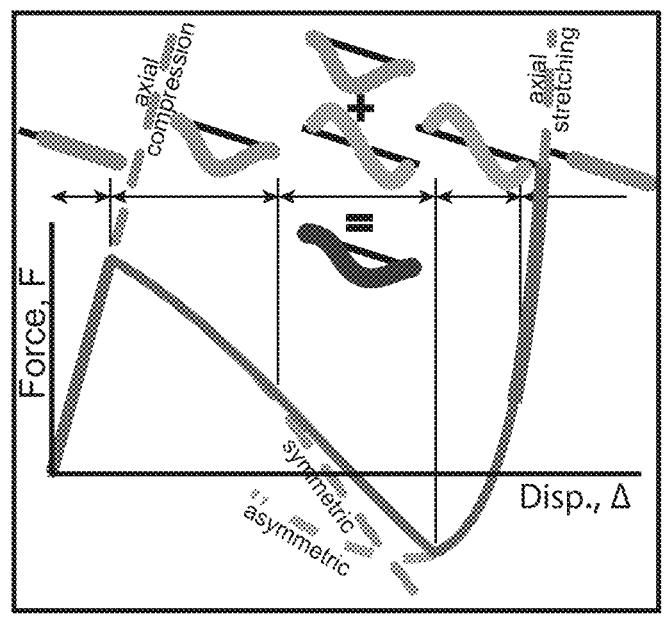
FIG. 16A is a graph that plots the load-displacement response of a uniform inclined guided beam showing five distinct stages of deformation.
Figure 16B:
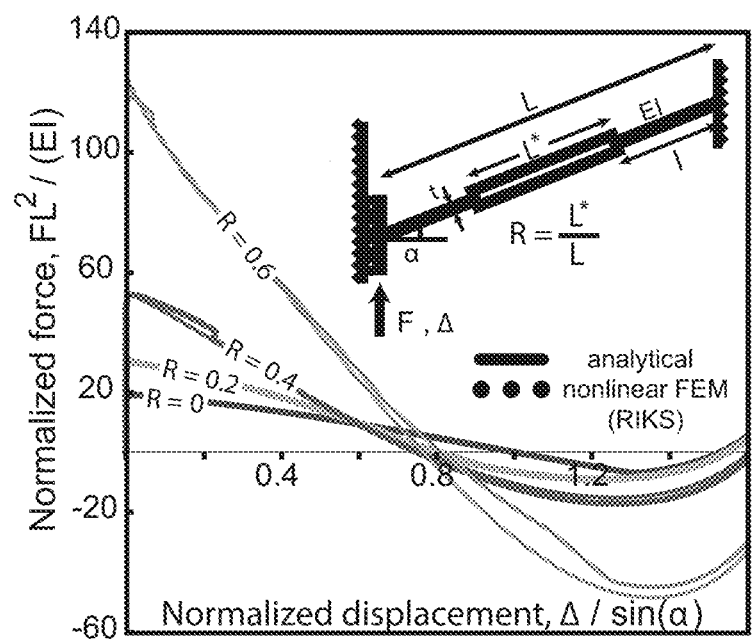
FIG. 16B is a graph that plots the load-displacement response of an inclined guided beam with rigid middle section with length ratios of R=0, 0.2, 0.4, and 0.6 and from analytical and FE methods.
Figure 16C:
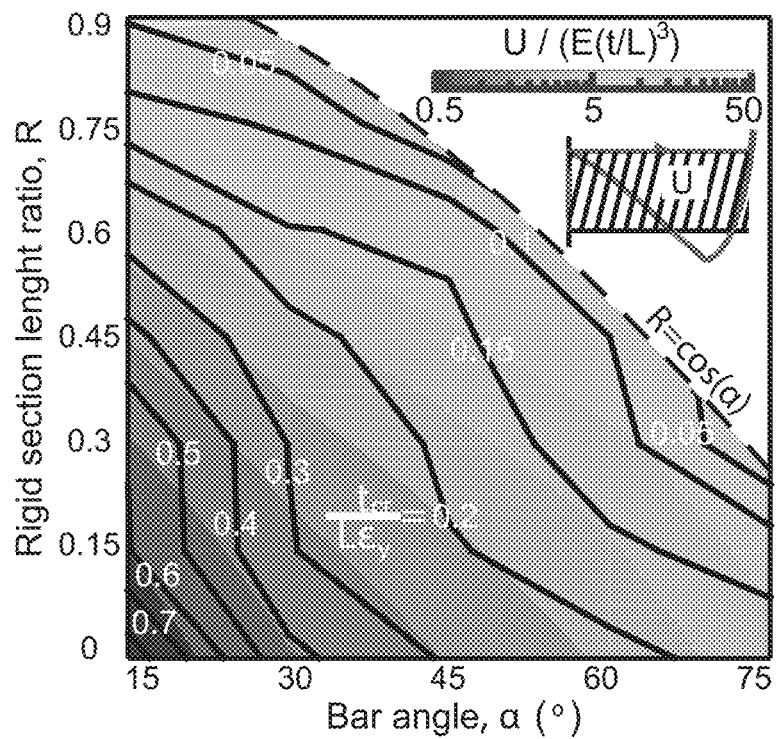
FIG. 16C is a graph that plots the logarithmic-scale contour plot of absorbed energy per unit volume until full-densification of the one-dimensional shape reconfigurable structure shown in the inset of FIG. 16D as a function of R and α.

As discussed above, the normalized snap-through strength of uniform inclined guided beams of various angles is bound by $4\pi^2$, which significantly limits the strength and energy absorption capacity of the triangular units and, consequently, the disclosed structures and mechanisms. To remedy this, the inclined beam was replaced with a uniform cross-section in the design with a stepped beam comprising a relatively thick and rigid section in the middle and two sections of equal length with smaller cross-section on the two sides, as shown in FIG. 16B. The parameter R is defined as the ratio between the rigid section and the overall beam length, as shown in the inset of FIG. 16B. As R approaches 1, the result is essentially a beam with two living hinges on each side, localizing the strain energy of the deformed structure at those regions. FIG. 16B shows the force displacement response of inclined beams with $\alpha=15°$ for different values of R, illustrating that the snap-through strength and negative stiffness both significantly increase by increasing R. On the other hand, the localization of deformation at that hinges by increasing R can lead to their premature failure. For a given base material and hinge design (meaning given combinations of $\alpha$ and R), a critical hinge thickness will exist above which the material will yield or fracture upon snap-through, thus preventing reconfigurability. This critical condition was analytically studied and the results are shown in FIG. 16C, which plots the absorbed energy per unit volume (energy density) of the tessellated structure shown in the inset of FIG. 16D until full densification (this energy is represented schematically by the hatched area in the figure inset) as a function of angle, a, and length ratio, R. The energy density is normalized by $E(t/L)^3$, where E, t, and L denote the material Young's modulus, hinge thickness, and overall inclined beam length, respectively (note that energy scales with $(t/L)^3$ when $t/L\ll 1$). The at the top right hand corner of the plot bordered by the dashed line embodies combinations of R and $\alpha$ that are not kinematically feasible for a bistable mechanism because the length of the rigid section is so large (i.e., $R>\sin(\alpha)$) that it cannot rotate clear of the two side walls. The overlaid solid contour lines in the same figure show the critical hinge thickness ratio, $t^{cr}/L$, normalized by the material yield strain, $\varepsilon_y$. Any thickness value greater than $t^{cr}$ would cause the hinge to fail before snapping. Theoretical analysis that was conducted shows that, for linear elastic materials with relatively small values of elongation at failure ($\varepsilon_y<0.1$), a category that includes most available materials, the value of critical hinge thickness ratio, $t^{cr}/L$, scales with $\varepsilon_y$. As a result, the maximum strength and dissipated energy per unit volume of the structure both scale with $E\varepsilon_y^3$. However, for $\varepsilon_y\gg 1$ (representative of many elastomers), the maximum strength and dissipated energy per unit volume both scale with $\varepsilon_6^{3/2}$ and the critical feature size scales with $\varepsilon_y^{1/2}$. The appropriate base material, in general, should be chosen considering the tradeoff between maximizing the maximum allowable feature size ($\sim\varepsilon_y$), thus requiring less sophisticated manufacturing techniques, and maximizing the structural performance ($\sim E\varepsilon_y^3$).

Figure 16D:
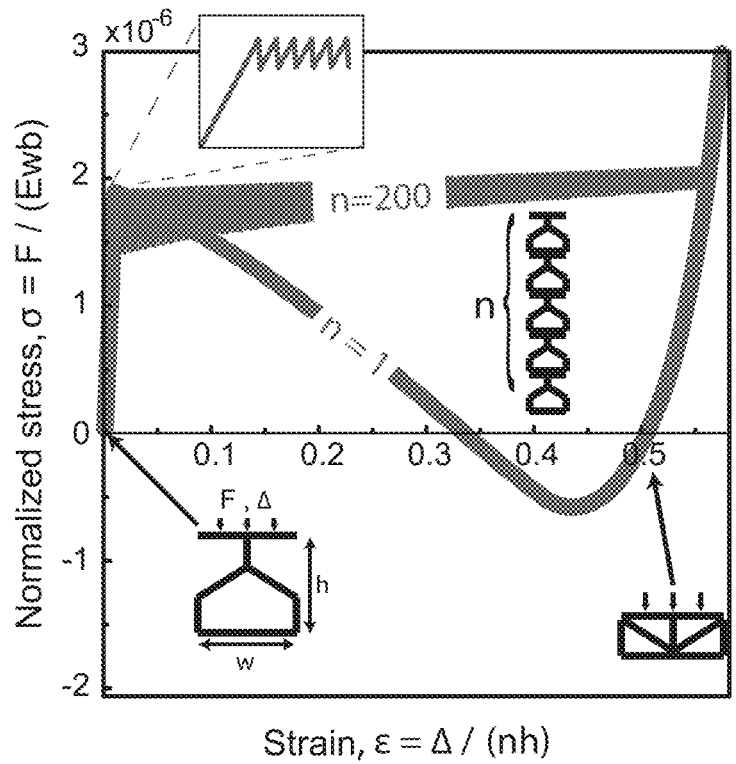
FIG. 16D is a graph that plots the normalized stress—strain response of a single bistable unit and a stack of 200 bistable units under quasi-static displacement control compression obtained from a numerical scheme.

Contrary to continuum systems with convex elastic energy, the stress-strain response and the hysteresis behavior of a chain of discrete bistable elements differs significantly from that of a single element. In order to study the behavior of a stack of bistable units, a numerical code was developed that enables calculation of the macroscopic behavior of material based on a generic stress-strain behavior of a single element obtained from the numerical method, without requiring tri-linear or cubic approximations. FIG. 16D compares the stress-strain response of a stack of 200 bistable units (n=200 curve) and a single unit under quasi-static displacement control compression (n=1 curve). Upon loading the stack, one or more of the bistable units that have the lowest strength values (e.g., due to material imperfections and geometrical variations) will snap through (collapse) first at a stress value close to the nominal strength, thereby causing the other cells in the stack to partially relax and the load to drop as shown by the curve in FIG. 16D. This sequence of gradual increase and sudden drop in the stack reaction force continues until all the cells in the stack collapse and full densification is reached. The resulting hysteresis from different paths during loading and unloading due to cell relaxation at a fix displacement renders the energy absorption capacity of the tessellated structure significantly higher than the sum of those of the individual units (i.e., the area under the n=200 curve). The difference in absorbed energy is dissipated through mechanical vibrations of the collapsing and relaxing cells at each load drop. This strategy can also be used to obtain a significant range of deformation at a relatively constant load. In human and animal muscle fibers, thousands of multistable titin molecules linked in series are responsible for creating a relatively constant reaction force over a significant range of tissue stretch, which is essential for muscle's passive elasticity.

Figure 17A:
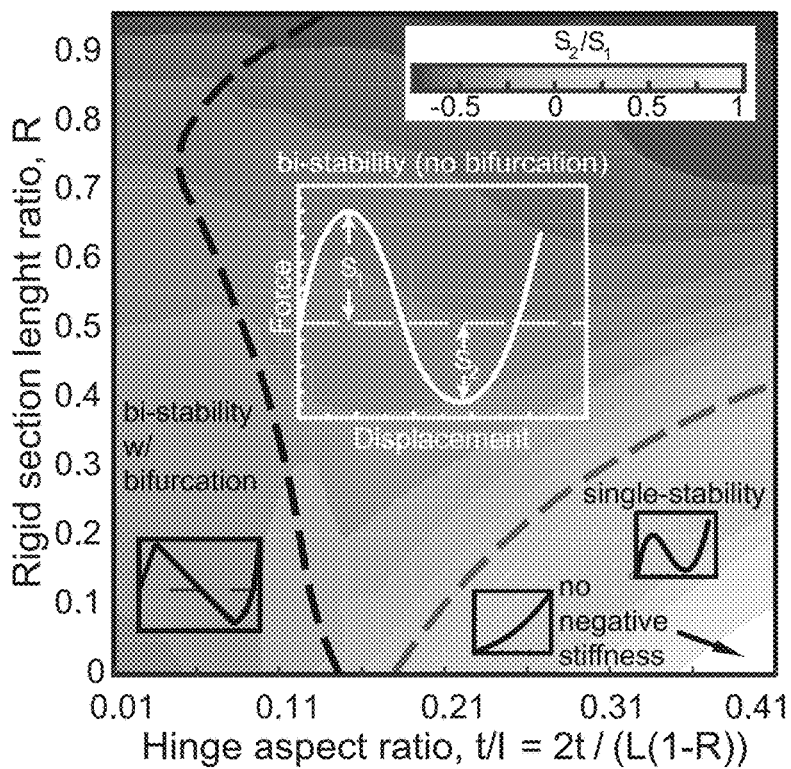
FIG. 17A is a graph that plots the phase stability parameter, $S_2/S_1$, for a structure with $\alpha=15°$.

For applications involving shape reconfigurability, the stability of the various deformed phases are critical. The phase stability in general is affected by the non-dimensional rigid section length, R, the hinge angle, α, and the hinge thickness ratio, t/l=t/L·((2/(1−R)), where 1 is the hinge length. In FIG. 17A, the phase stability parameter, defined as $S_2/S_1$, is plotted versus t/l and R for a constant α=15°. $S_1$ and $S_2$ denote the maximum and minimum force values, respectively, between the first and third equilibrium points. The figure shows three distinct regions of stability behavior. The region on the left is when the hinge thickness ratio is small and, therefore, the values of $S_1$ and negative stiffness are controlled by the symmetric bending of the beam in the negative stiffness (spinodal) phase. When the hinge thickness is greater than 0.17 and R is small, the structure is single stable and $S_2$>0. The middle region represents cases in which the structure is bistable, however, the slope of the force-displacement curve is continuous due to a more significant contribution of axial stretching (e.g., $t/l > \sqrt{(9\alpha^2)/(4\pi^2 \sin(\alpha))}$ when R=0). The slope of the curve at different phases is critical to the multi-cell behavior of multistable unit chains. The results also show that the use of stepped beam (i.e., R>0) significantly expands the bistable region.

Figure 17B:
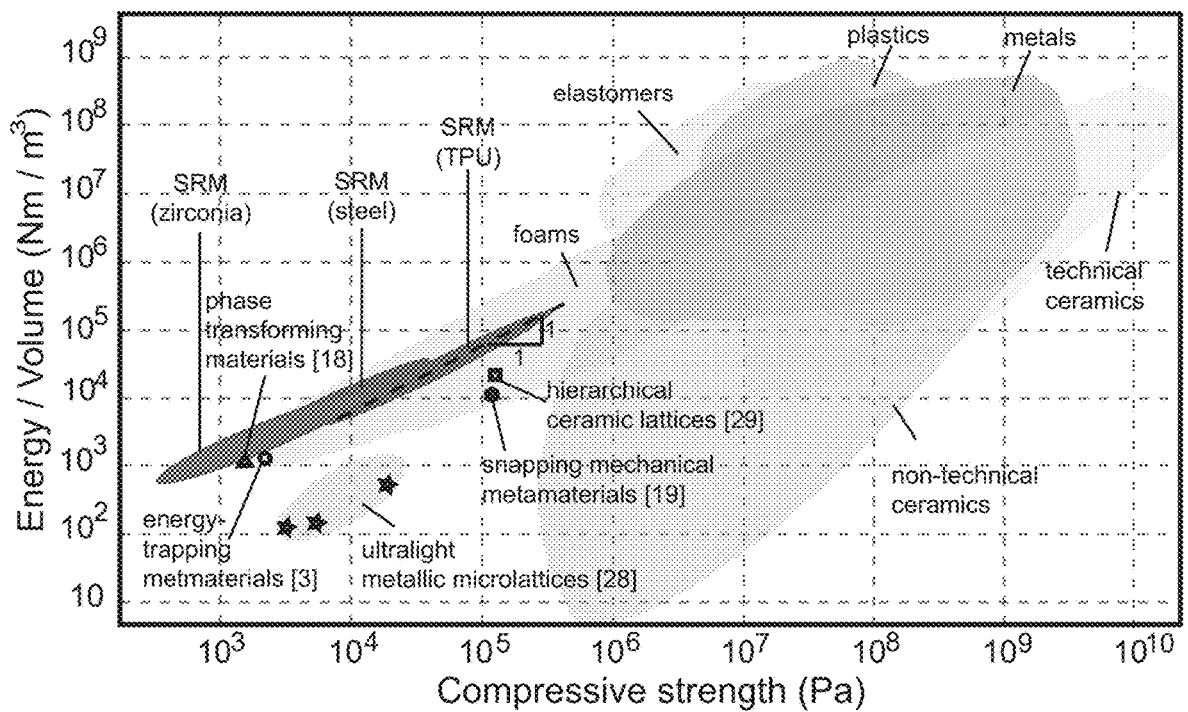
FIG. 17B is an Ashby plot of the absorbed energy per unit volume versus the compressive strength for the universe of existing materials for the disclosed multistable share-reconfiguration structures and mechanisms.

For energy absorption applications, juxtaposition of the performance of the proposed materials with the universe of existing materials is instructive. FIG. 17B shows an Ashby map of absorbed energy per unit volume versus compressive strength. Materials in the top left corner of the map will be optimal from an impact-resistance perspective. Results for different base materials are presented: an elastomer (TPU), a metal (steel), and a ceramic (zirconia). The proposed shape-reconfigurable structures overlay part of performance region of elastomers and outperforms previously proposed micro-lattices with substantial recoverability from large strains including ultralight and hierarchical architected materials.

In summary, disclosed are multistable shape-reconfigurable structures and mechanisms based on a structural building blocks encompassing living hinges. One-dimensional, two-dimensional, and three-dimensional structures and mechanisms can be designed, enabling complex shape-morphing patterns. One of the key benefits of the designs is the reversibility between different stable states, implying that the original or deformed configurations of the structure can be infinitely recovered with no compromise on the efficiency, integrity or life of the structure. However, the localization of the majority of trapped strain energy on the hinges makes the failure strain of the hinge material critical to the viability of the proposed concept and imposes significant restraints on material selection. This requirement is material-specific. Reducing the feature size in these structures is shown to be a possible solution for creating hinges that will undergo snapping without plastic deformation. Both metals and ceramics generally become stronger as the critical length scale is reduced (by virtue of well-established size effects in plasticity and fracture), making the failure strain of the hinge material significantly higher at the nano-scale and thus resulting in more efficient multi stable designs. Reducing the size of the unit cell could also lead to increased smoothness of the outlines in the desired topologies, thus enabling better dimensional control. Finally, scale reduction in the unit cell generally results in a larger number of unit cells per unit volume in the macro-scale structure, which enhances energy dissipation in discrete materials systems with negative stiffness mechanisms.

In the discussion that follows, mathematical analysis is presented that supports the disclosure provided above. The analysis of the snap-through behavior of a bistable triangular unit with a vertical force F acting on the top (FIG. 18A) can be reduced to analysis of an inclined guided beam by virtue of the axial symmetry with respect to the center line of the structure and the fact that the triangle base is relatively rigid and thus cannot bend or stretch. Large deformations of an inclined guided uniform beam has been numerically studied before. Here we use the beam-deflection theorem to gain insight on the deformation modes and also to obtain closed-form solutions for the load-displacement response of an inclined guided beam with the rigid middle section.

Figure 18A:
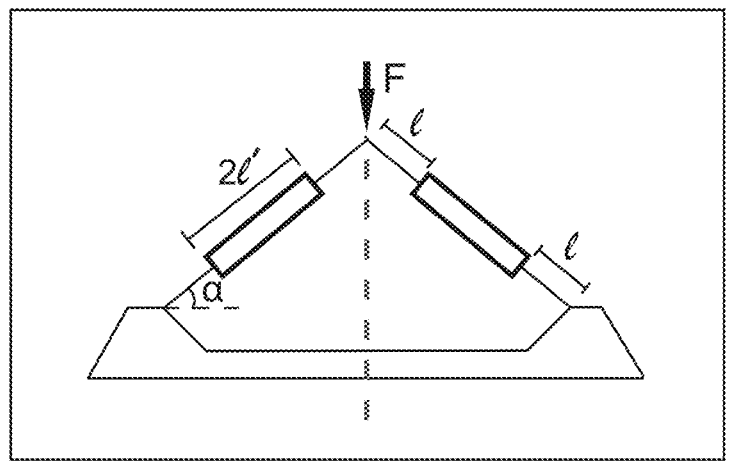
FIG. 18A is a schematic of a triangular bistable unit.

Beam deflection or beam column formulas are nonlinear formulas linking the end rotations of an axially loaded beam to its end moments. For a single beam connecting nodes a and b under axial compressive force P and subjected to the two counter-clockwise end couples $M_a$ and $M_b$, the end rotations $\theta_a$ and $\theta_b$ (positive when counter-clockwise) relative to the line joining the displaced end nodes (see FIG. 18C) can be obtained through the beam-column relations as:

$$\theta_a = \frac{M_a \ell}{EI}\Phi(q) + \frac{M_b \ell}{EI}\Psi(q) \qquad (1)$$
$$\theta_b = \frac{M_a \ell}{EI}\Phi(q) + \frac{M_b \ell}{EI}\Psi(q)$$

Here, $\Phi(q)=(1/\sin q - 1/q)/q$ and $\Psi(q)=(1/q - 1/\tan q)/q$ are nonlinear functions of the non-dimensional loading parameter q, defined as $q=l\sqrt{P/(EI)}$, where P is the beam axial force (positive when compressive), l is the beam length, and EI is the beam flexural rigidity. The functions $\Phi$ and $\Psi$ can be approximated by even-order expansions, climbing monotonically from $\Phi=\frac{1}{6}$ and $\Psi=\frac{1}{3}$ when q=0 to infinity when q=π. The set of equations (1) can be inverted to solve for the beam end moments as:

$$M_a = \frac{EI}{\ell}\left(\frac{\theta_a \Psi(q) - \theta_b \Phi(q)}{\Psi^2(q) - \Phi^2(q)}\right) \qquad (2)$$
$$M_b = \frac{EI}{\ell}\left(\frac{\theta_b \Psi(q) - \theta_a \Phi(q)}{\Psi^2(q) - \Phi^2(q)}\right)$$

From the beam-column theorem, the deflection of a column-beam can be calculated as:

$$y = \frac{-M_b}{\rho}\left(\frac{\sin k(\ell-x)}{\sin k\ell} - \frac{\ell-x}{\ell}\right) + \frac{M_a}{\rho}\left(\frac{\sin kx}{\sin k\ell} - \frac{x}{\ell}\right) \qquad (3)$$

which allows calculation of the beam axial contraction, Δl, in terms of beam end moments according to $$\Delta \ell = \frac{1}{2}\int_0^\ell (dy/dx)^2 dx,$$

resulting in:

$$\Delta \ell = \ell^3\left((M_a^2 + M_b^2)\left(\frac{\Phi(2q)}{q\tan q} - \frac{\Psi(q)}{2q^2}\right) - M_a M_b\left(\frac{\Phi(q)}{q^2} - \frac{\Psi(q)}{2q\sin q}\right)\right)/(EI)^2 \qquad (4)$$

Figure 18B:
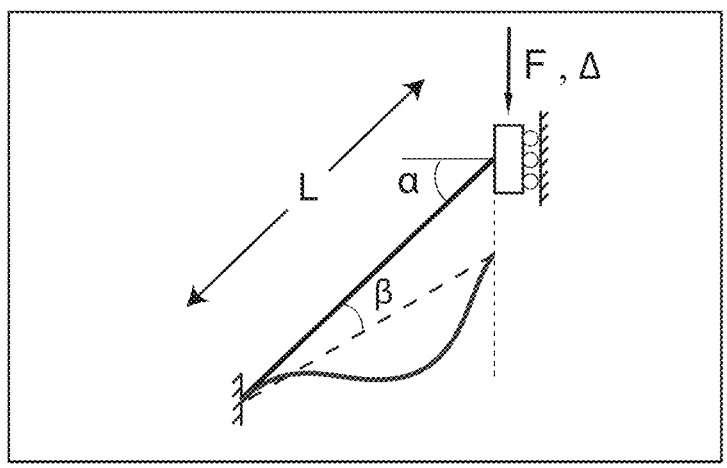
FIG. 18B is a schematic showing a beam in the initial and deformed orientations.
Figure 18C:
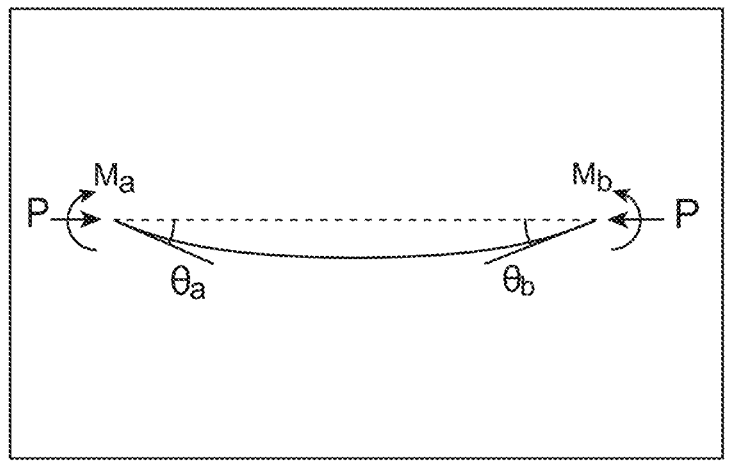
FIG. 18C is a schematic showing notations used for beam-deflection method.

FIG. 18B shows a schematic of an inclined guided beam in the initial and deformed configurations, where the overall direction of the beam has rotated by an angle β. To obtain the force-displacement response, we divide the deformation of the inclined beam into three components, namely the axial shrinkage due to beam axial forces, the symmetric bending, and the asymmetric bending. We use the beam deflection formula to solve for the beam forces and moments for each of these deformation components.

Figure 18D:
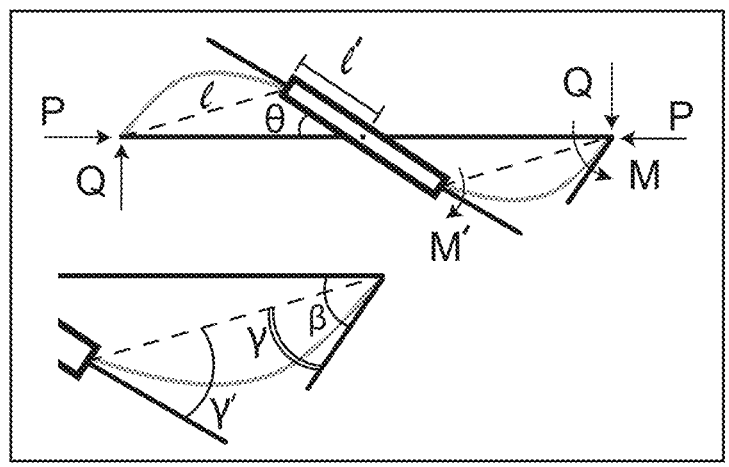
FIG. 18D is a schematic showing notations used here for describing the asymmetrical deformation of the stepped beam.

In the case of the beam with the rigid middle section deformed asymmetrically as shown in FIG. 18D, the end moments $M_a$ and $M_b$ can be found by simultaneously solving the following set of 7 unknown (i.e. M,M',γ,γ',β,P and Q) and 7 equations:

$$M = \frac{EI}{\ell}\left(\frac{\Psi(q)\gamma - \Phi(q)\gamma'}{\Psi(q)^2 - \Phi(q)^2}\right) \quad (5)$$

$$M' = \frac{EI}{\ell}\left(\frac{\Psi(q)\gamma' - \Phi(q)\gamma}{\Psi(q)^2 - \Phi(q)^2}\right)$$

$$2M' = 2P\ell'\sin\theta + 2Q\ell'\cos\theta$$

$$2M = Q(2\ell\cos(\beta - \gamma) + 2\ell'\cos\theta)$$

$$L'\sin\theta = \ell\sin(\beta - \gamma)$$

$$q = \ell\sqrt{\frac{P\cos(\beta - \gamma) + Q\sin(\beta - \gamma)}{EI}}$$

$$\gamma' = \theta + \beta - \gamma$$

where $$q = \ell\sqrt{\frac{P}{EI}}.$$

Solving the system of equations (5) allows calculation of beam shrinkage, $\Delta l^{asym}$, as a function of q from Eq. (4).

Figure 18E:
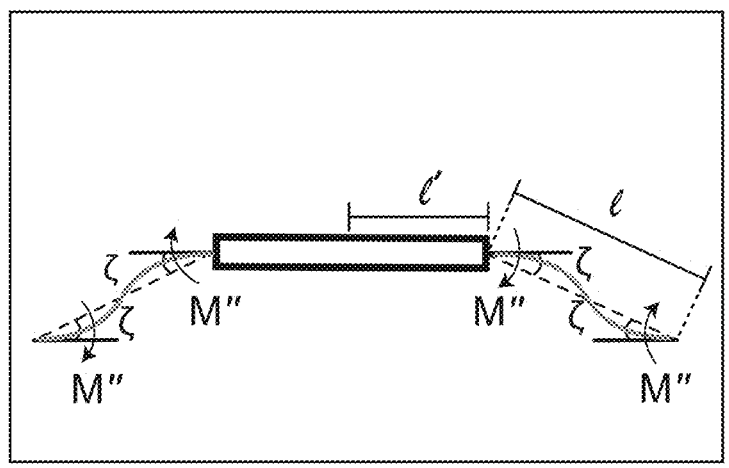
FIG. 18E is a schematic showing notations for describing the symmetrical deformation of the stepped beam.
Figure 19A:
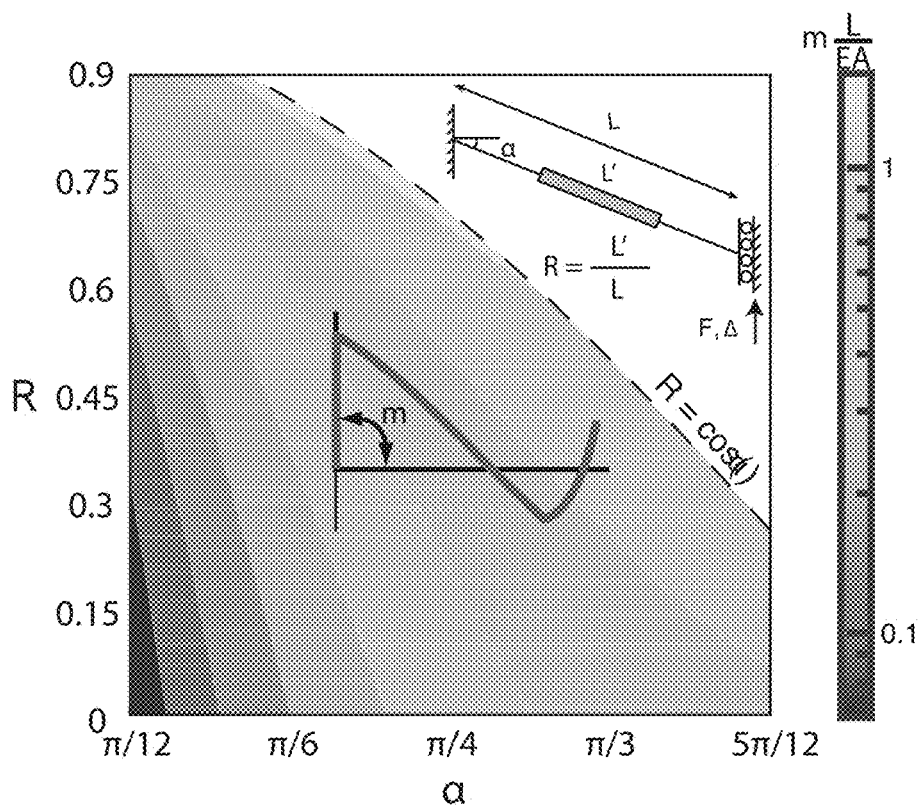
FIG. 19A is a contour plot showing the initial slope of the snap-through response of an inclined guided beam as a function of R and $\alpha$.
Figure 19B:
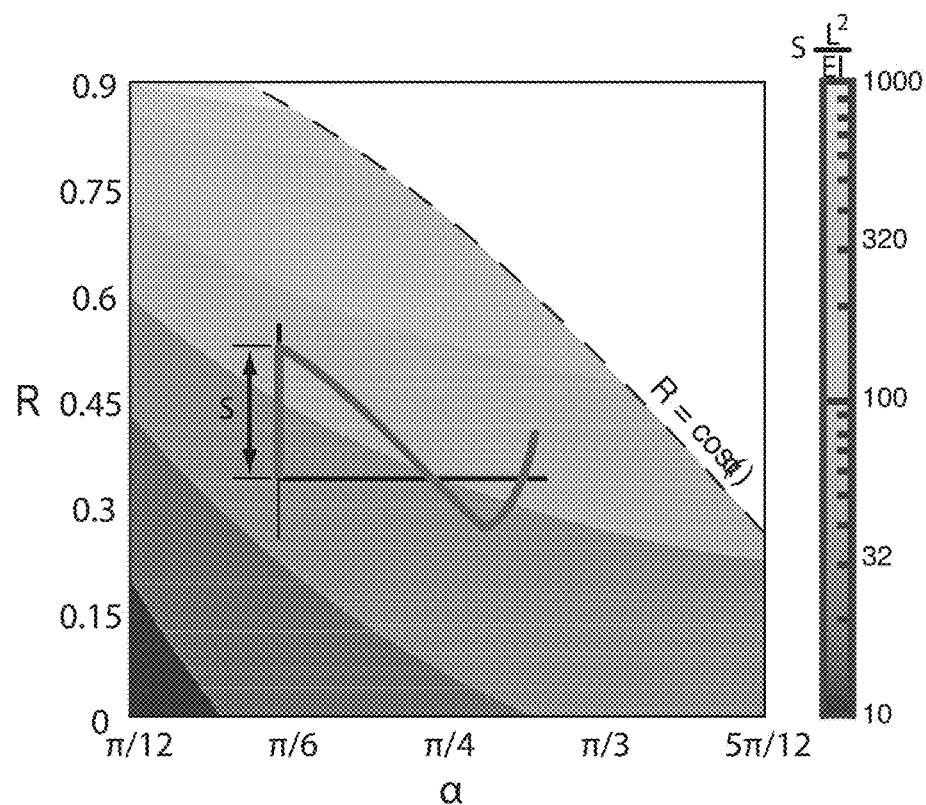
FIG. 19B is a contour plot showing the snap-through strength of the snap-through response of an inclined guided beam as a function of R and $\alpha$.
Figure 19C:
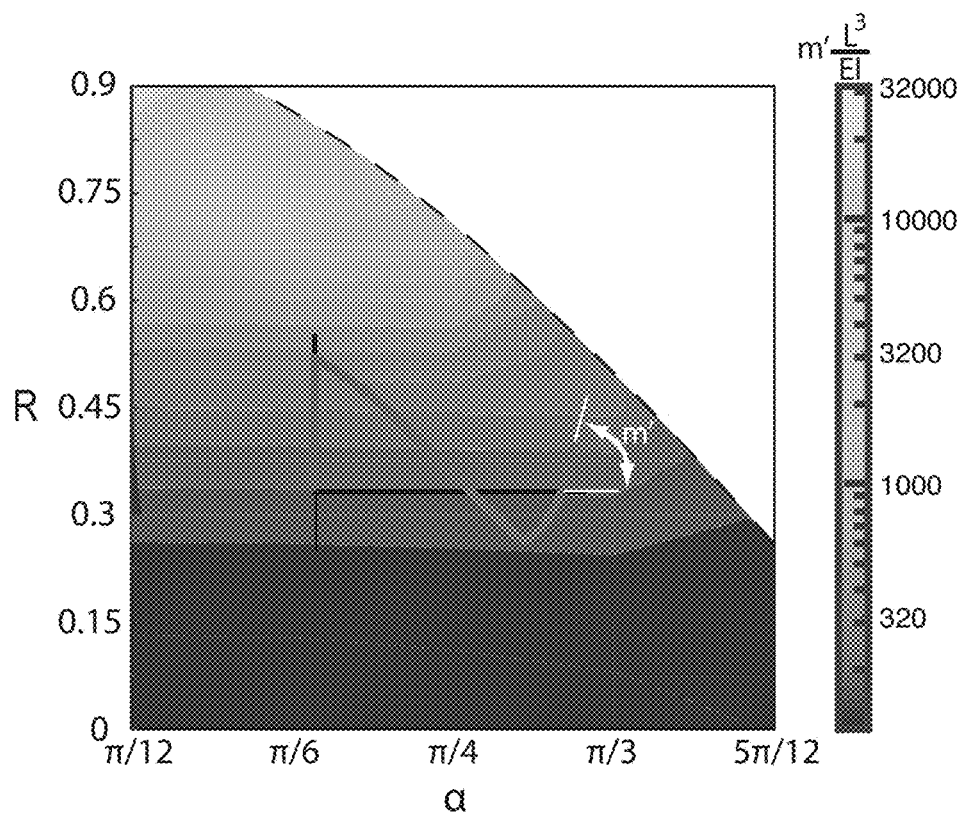
FIG. 19C is a contour plot showing the slope of the third equilibrium point in the load-displacement curve of the snap-through response of an inclined guided beam as a function of R and $\alpha$.
Figure 19D:
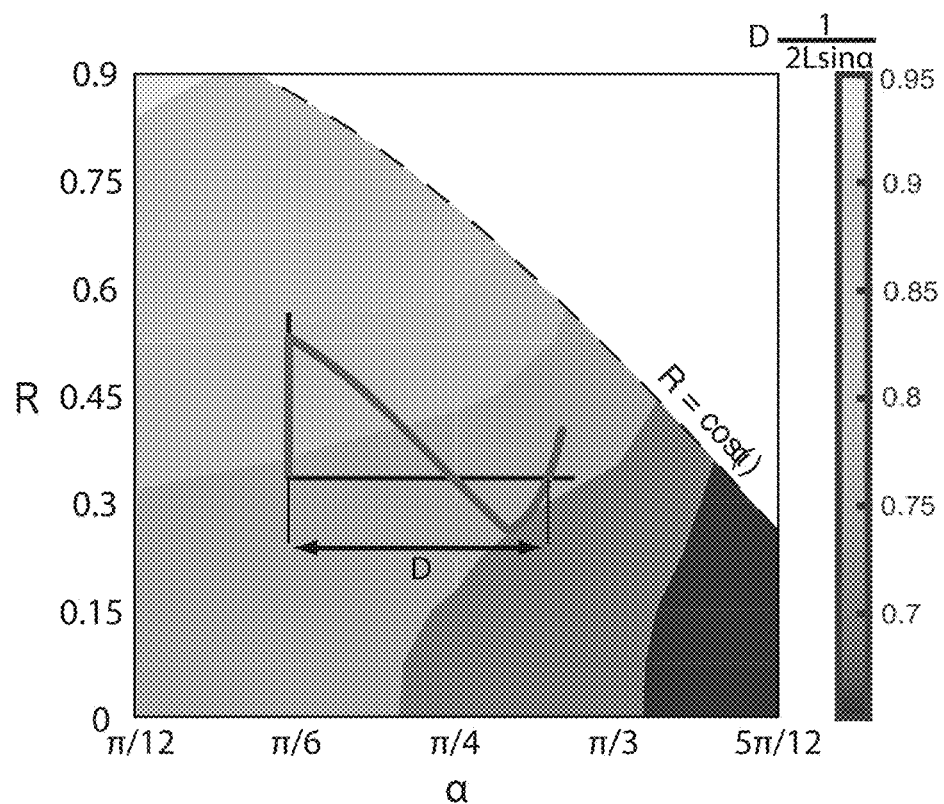
FIG. 19D is a contour plot showing the distance between the first and third equilibrium points in the snap-through response of an inclined guided beam as a function of R and $\alpha$.

In the case of a beam with rigid middle section deformed symmetrically shown in FIG. 18E, each beam segment can be considered as a beam deformed asymmetrically with respect to its own axis shown by dashed lines (i.e., $M_a = -M_b = M''$). The deflection of the beam can be found by solving the following set of 2 equations with 2 unknowns (M" and ξ):

$$\xi = \frac{M''\ell}{EI}(\Psi(q') - \Phi(q')) \quad (6)$$

$$M'' = \frac{P\ell\sin\xi}{2}$$

$$q = \ell\sqrt{\frac{P\cos\xi}{EI}}.$$

where Note that since for the shrinkage due to symmetric deflection of the beam with rigid middle section the load parameter q' is also a function of deflection angle, ξ, the unknowns need to be found through iterations. Now, Eq. (4) can be readily used to calculate the amount of shrinkage by substituting $M_a = -M_b = M''$ in Eq. (4). Note that the rigid body rotation of each segment of length e will also contribute to the total amount of shrinkage for the asymmetrical component of deformation, $\Delta l^{sym}$.

For the axial component of deformation, the amount of shrinkage can be obtained as $$\Delta l^{axial} = \frac{P\ell}{EA}.$$

Once $\Delta l^{asym}$, $\Delta l^{sym}$ and $\Delta l^{axial}$, are found one can obtain the total amount of shrinkage of stepped beam as:

$$\Delta l = \Delta l^{asym} + \Delta l^{sym} + \Delta l^{axial} \quad (7)$$

Concerning an inclined guided beam problem restrained between two vertical walls, the overall axial contraction of the beam can be geometrically expressed as:

$$\Delta\ell = \ell\left(1 - \frac{\cos(\alpha)}{\cos(\alpha - \beta)}\right) \quad (8)$$

By equating the expressions of overall shrinkage of beam from Eqs. (7) and (8), the value of non-dimensional force parameter q and consequently internal beam forces are found.

Next, we present different characteristic contour plots for the snap-through response of an inclined guided beam (see FIG. 19). These contour plots are obtained directly from the analytical solution described in the previous section and show different characteristic parameters in the load displacement response of an inclined guided beam versus different values of angle, α, and rigid section length ratio, R. FIGS. 19A-19D show normalized values of the initial slope, the snap-through strength, the slope at the third equilibrium point of the load-displacement curve and, the distance between the first and third equilibrium points, respectively. The value of initial slope is controlled by the stretching of the beam and therefore is normalized by $$\frac{EA}{L},$$

where E is material Young's modulus, A is beams cross section and L is the overall beam length. The values of snap-through strength, slope of curve at third equilibrium and the distance between the first and third equilibrium points are controlled by the bending of the deformable beam segments (hinges) at small thicknesses of the two beam segments and therefore normalized by $$\frac{EI}{L^2}, \frac{EI}{L^3}$$

and 2L sin α, respectively, where I is the second moment of inertia for the two deformable beam segments. The design maps in FIG. 19 provide insight on optimum geometries for a range of different applications.

Figure 20A:
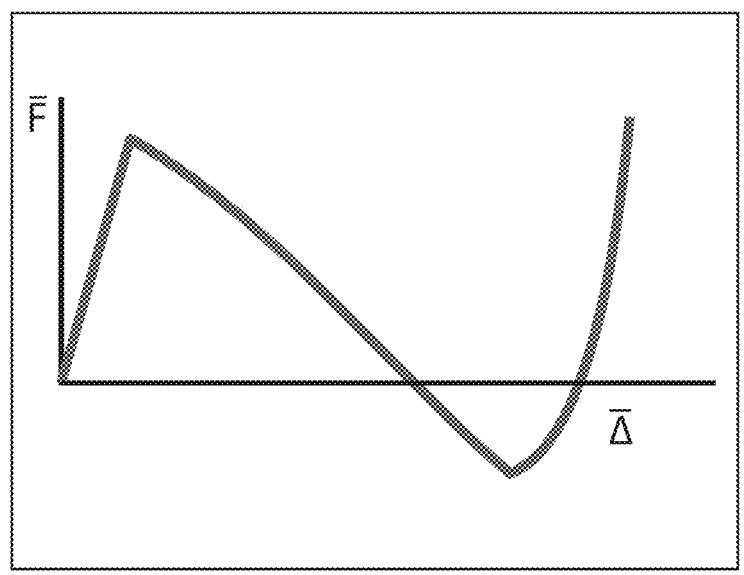
FIG. 20A is a graph that plots the force displacement response of an inclined guided beam shown in FIG. 18B.
Figure 20B:
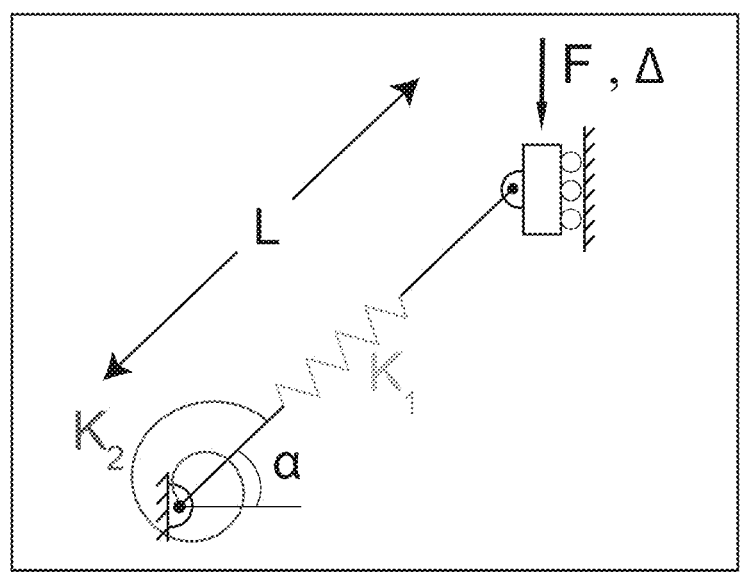
FIG. 20B is a schematic of an object only allowed to slide vertically and is linked to an inclined linear spring of coefficient $K_1$.
Figure 20C:
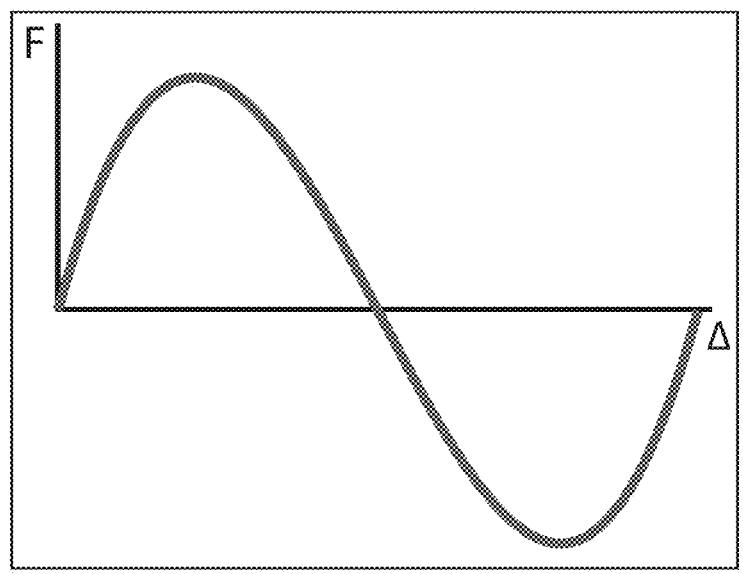
FIG. 20C is a graph that plots the representative force-displacement response of problem defined in FIG. 20B with $K_2=0$.

In the problem of an inclined guided beam under compressive loads, when the thickness of the beam normalized by beam length is small, the snap-through strength is determined by the symmetric buckling in the beam segments, as described in the main document. A schematic of such a response is shown in FIG. 20A, manifesting a discontinuity in the load-displacement curve at the maximum load. However, when the inclined beam thickness ratio is large enough, the symmetric buckling strength of the beam is higher than the maximum axial load induced in the guided beam during snap-through, and the general form of behavior changes. To study the latter, consider the simplified problem of force-displacement of an object that is only allowed to slide vertically and linked to an inclined linear spring of coefficient $K_1$, as shown in FIG. 20B. The linear spring is in turn coupled with a rotational spring of coefficient $K_2$. Satisfying the equilibrium for the object, the load-displacement response is obtained as:

$$F(\Delta) = K_1 L \left(1 - \sqrt{1 - 2\sin\alpha \frac{\Delta}{L} + \left(\frac{\Delta}{L}\right)^2}\right) \cdot \sin\left(\tan^{-1}\left(\tan\alpha - \frac{\Delta}{L\cos\alpha}\right)\right) + \quad (9)$$
$$K_2\left(\alpha - \tan^{-1}\left(\tan\alpha - \frac{\Delta}{L\cos\alpha}\right)\right) \cdot \frac{1}{L\cos\alpha}$$

which has a near sinusoidal response as shown in FIG. 20C, suggesting the maximum force happens around $\Delta = L \sin \alpha/2$. Substituting $\Delta = L \sin \alpha/2$ in Eq. (9) and using Taylor expansion with respect to $\alpha$, the maximum force can be approximated as:

$$F^{max} = K_1 L \frac{3\alpha^3}{16} + \frac{K_2}{L}\frac{\alpha}{2} \quad (10)$$

For the problem of an inclined guided beam with aspect ratio of R and angle $\alpha$ with respect to horizontal line, the values of $K_1$ and $K_2$ can be approximated according to Euler-Bernoulli beam theory as $$K_1 = \frac{EA}{2\ell} \quad (11)$$
$$K_2 = \frac{EI}{2\ell}$$

Substituting from Eq. (11) in Eq. (10), the value of $F^{max}$ can be approximated as $$F^{max} = \frac{3\alpha^2 EAL}{32\ell} + \frac{\alpha EI}{4\ell L} = \frac{3\alpha^3 Ebt}{16(1-R)} + \frac{\alpha Ebt^3}{24(1-R)L^2} \quad (12)$$

Comparing $F^{max}$ from Eq. (12) to buckling strength of an inclined guided beam, $$F^{max} = \frac{4\pi^2 EI \sin\alpha}{L^2(1-R)^2} = \frac{\pi^2 Ebt^3 \sin\alpha}{3L^2(1-R)^2},$$

the critical thickness of the hinges that will cause the inclined beam to snap-through without buckling is obtained as:

$$\frac{t^{cr}}{L} = \sqrt{\frac{9\alpha^3(1-R)}{16\pi^2\sin\alpha - 2(1-R)\alpha}} \quad (13)$$

When $t > t^{cr}$, the inclined guided beam will bend and shrink axially without any bifurcation happening at any stage through the snap-through process. The force-displacement response will be represented by a smooth curve without any slope discontinuity. Expressions (13) can be simplified to $$\frac{t^{cr}}{L} = \sqrt{\frac{9\alpha^3(1-R)}{16\pi^2\sin\alpha}} \text{ when } R \to 1.$$

As suggested by the beam-column formula (1), the deflection of a beam-column is determined by the normalized values of end beam moments, Ml/EI. Also, emergence of q as a non-dimensional parameter in the problem makes $Pl^2/EI$ a non-dimensional group affecting the problem. Similarly, by satisfying requirements of equilibrium, it can be shown that the amount of transverse load is linked to beam-deflection as $Ql^2/EI$. Therefore, the deflection, shrinkage or curvature of a beam-column remains relate to the values of moment and force normalized by EI/l and $EI/l^2$, respectively, neglecting the effect of axial shrinkage on the overall shrinkage of the beam.

Following the argument above, the amount of absorbed energy by deflection of a beam-column throughout snap-through for given R and a, described by the area under the force-displacement curve, is proportional to EI or $Et^3$, where t is the hinge thickness shown in FIG. 16B.

As for the value of critical (minimum) hinge thickness causing failure in the hinges, the amount of maximum strain due to internal moments and forces can be written as a $$\varepsilon_y = \left|\frac{M^* t/2}{EI}\right| + \left|\frac{P^*}{Etb}\right| = \left|\frac{M^*}{2}\right|\left(\frac{t}{\ell}\right) + \left|\frac{P^*}{12}\right|\left(\frac{t}{\ell}\right)^2 \quad (14)$$

where M*, P* are the maximum values of moment and force throughout snap-through of the inclined guided hinged beam and b is the hinge width. Eq. (7) can be re-written as:

$$\left(\frac{t}{t_2}\right)^2 + \left(\frac{t}{t_1}\right) - \varepsilon_y = 0 \quad (15)$$

where $$t_2 = \sqrt{\left|\frac{12}{P^*}\right|} \text{ and } t_1 = \sqrt{\left|\frac{2}{M^*}\right|}.$$

Equation (8) is a quadratic equation that has one positive root equal to:

$$t = \frac{-t_2^2}{2t_1} + \sqrt{\frac{-t_2^2}{4t_1^2} + \varepsilon_y t_2^2} \quad (16)$$

which results in:

$$\begin{cases} \dfrac{t_2^2}{4t_1^2\varepsilon_y} \gg 1 \to t^{cr} = \varepsilon_y t_1 \\ \dfrac{t_2^2}{4t_1^2\varepsilon_y} \ll 1 \to t^{cr} = \sqrt{\varepsilon_y}\, t_2 \end{cases} \quad (17)$$

Figure 21:
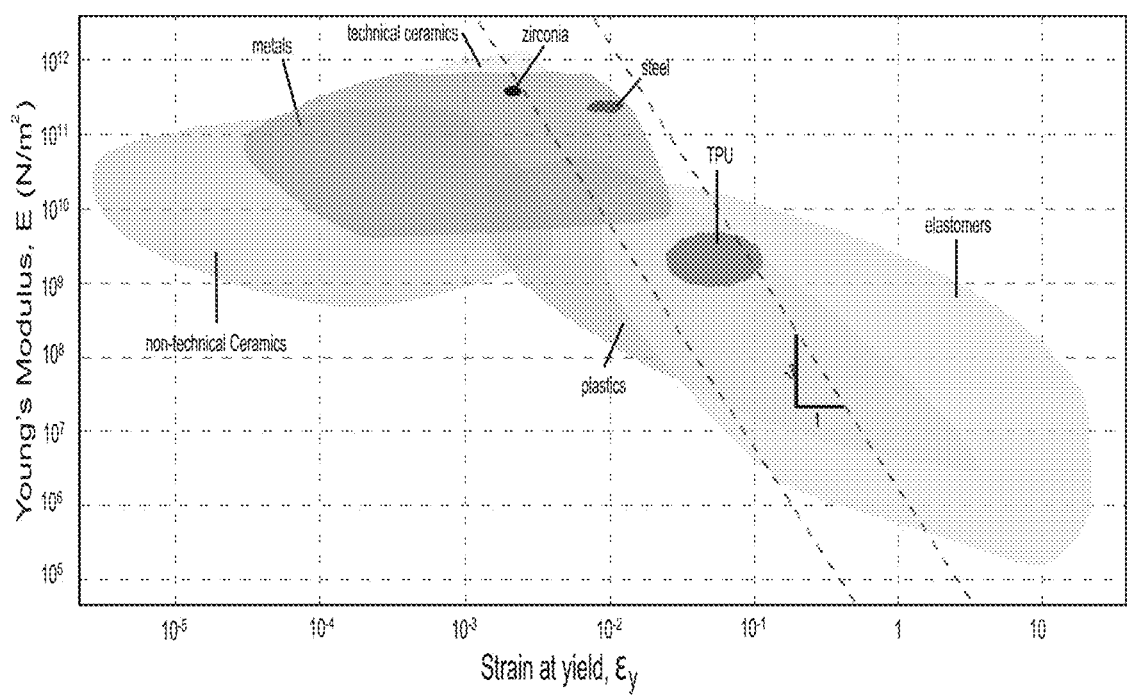
FIG. 21 is an Ashby map of Young's modulus versus strain at yield for the base material of proposed shape-reconfigurable materials. The dashed lines show base material selection lines of constant $E\varepsilon_y^3$ value.

As a result, when $\varepsilon_y \ll 1$ (which is the case for most existing materials), then the critical value of hinges thickness is proportional to $\varepsilon^y$; conversely, when $\varepsilon_y \gg 1$, the critical value of the hinge thickness is proportional to $\sqrt{\varepsilon_y}$. Since values of trapped strain energy and strength are proportional to $Et^3$, we can conclude that their maximum values occurring at the critical thickness are proportional to $E\varepsilon_y^3$. FIG. 21 shows an Ashby map of Young's modulus versus strain at yield for existing materials. The dashed lines represent selection lines of constant $E\varepsilon_y^3$ value. In the range of $\varepsilon_y \ll 1$, the three base materials of TPU (elastomer), steel (metal), and Zirconia (ceramic) were selected and their energy absorption and strength values were compared (see FIG. 17B).

Contrary to continuum systems with convex elastic energy, the stress-strain response and the hysteric behavior of a chain of discrete bistable elements differs significantly from that of a single element. In order to study the behavior of a stack of bistable units a numerical code was developed that allows calculation of macroscopic behavior of material based on a generic stress-strain behavior of a single element obtained from the numerical method, not necessarily tri-linear or cubic approximations. The load-displacement response of a stack of bistable elements under quasi-static displacement control compression can be obtained from post processing of the response of a single element. In our method, finite element simulations were performed on the single bistable element and the load-displacement response was obtained. Beam elements (B21) were used to model the bistable unit. Each unit consists of a rigid base and two inclined beams as shown in FIG. 18A and the downward vertical displacement, $\Delta$, is applied on top of the element. The Riks analysis in ABAQUS software was used to capture the post-buckling behavior of the bistable elements. Note that a static, general solver cannot converge in the existence of the snap-through mechanism. The effective stress-strain response of a single bistable element (n=1) is shown by the curve in FIG. 22. The value of effective stress is defined by $\sigma = F/Ewb$ where F is the vertical reaction force of the inclined beam, E is the Young's modulus of base material, w and b are the width and thickness of the beam, respectively. The value of effective strain is calculated as $\varepsilon = \Delta/nh$, where $\Delta$ is vertical displacement of the stack, n is the number of elements and h is the element height. The mechanical response of a single element is partitioned into three phases: the initial section of the load-displacement curve with a positive slope (phase I), the spinodal phase of negative stiffness, and the section where the slope becomes positive again (phase II). The macroscopic behavior of a stack of discrete bistable elements is found using the algorithm described below.

Upon loading a stack of bistable elements, one or a few of the bistable units that have the least strength values (e.g., due to material imperfections, geometrical variations) will snap through (collapse) first around the nominal value of strength, causing the other elements in the stack to partially relax and the internal load to drop as shown by the blue curve in FIG. 16D. This sequential effect makes the state of the collapsing elements in the spinodal phase or phase II of response different at any time from the uncollapsed elements in phase I of response. As a result the collective stress-strain behavior of the stack different from the stress-strain response of a single element. To reflect this variation in our numerical simulation, a slight variation in the Young's modulus of the element of the stack is introduced.

During the loading of a stack of bistable elements under quasi-static compression when all the element are either in their phase I or phase II the displacement of the structure at any given load f (depicted in FIG. 22) can be found by:

$$\Delta_{Structure} = \sum_{m=1}^{i} x_m^{II} + \sum_{k=i+1}^{n} x_k^{I} \quad (18)$$

where $x_k^I$ and $x_k^{II}$ are the displacement of beam k, under load f in the phase I and phase II respectively, n is the number of the beams in the structure, and i is the number of the beams already entered phase II. However, when one of the bars enters its spinodal phase, the load displacement relation changes. In a stable configuration, only one bar at a time can enter its spinodal phase and other beans are either in phase I or phase II. When the collapsing bar emerges from the spinodal phase and enters its phase II of response, for every representative force f the displacement cam be expressed as:

$$\Delta'_{Structure} = \sum_{m=1}^{i+1} x_m^{II} + \sum_{k=i+1}^{n} x_k^{I} \quad (19)$$

Next we set to calculate the amount of stress relaxation due to snap-through of each bar. Note that at each load drop associated with snap-through of a bar in the stack the overall height of the stack remains constant. We satisfy this condition by first allowing the snap-through of the collapsing bar (shown in the stress-strain curve by path S) without any displacement constraints on the stack and next relaxing the internal forces of all the elements in the stack, which have equal internal forces due to equilibrium, until the pre-collapsed displacement of the stack is restored.

Figure 22:
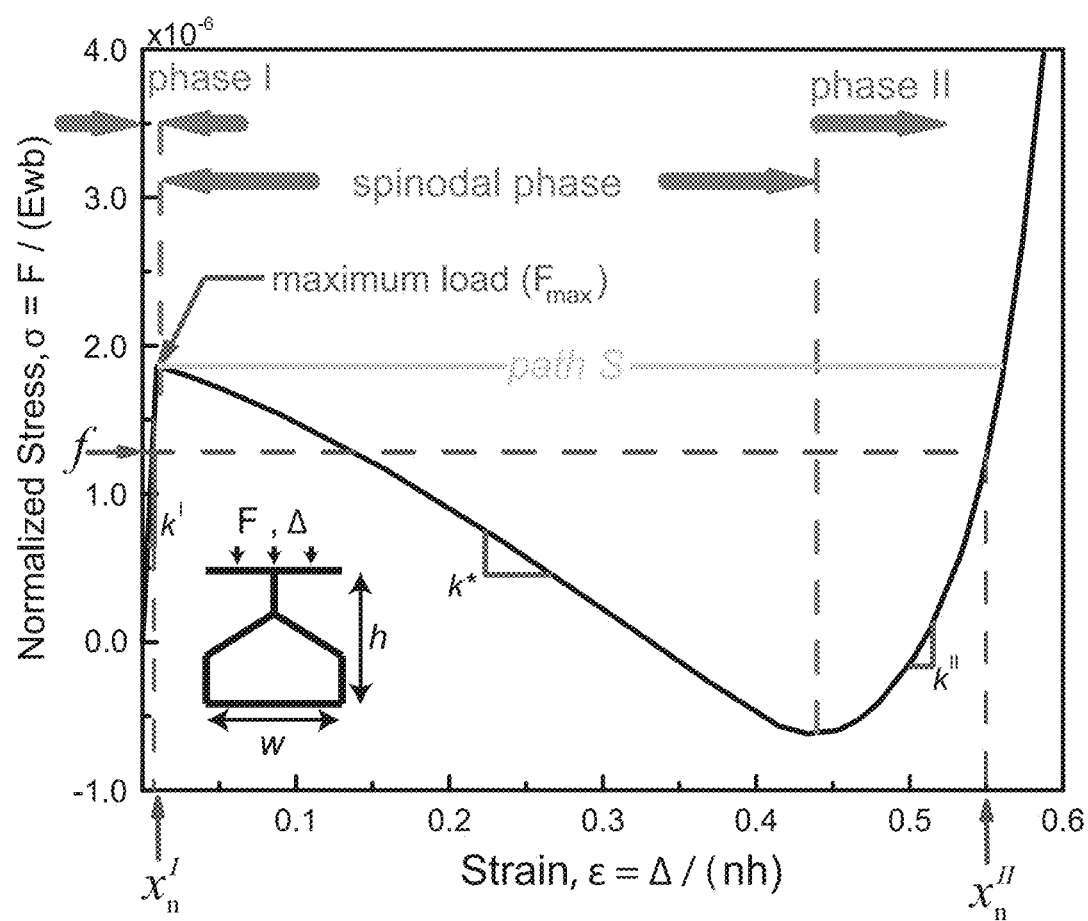
FIG. 22 is a graph that plots the stress-strain response of a single bistable unit under quasi-static compression test.

Satisfying expressions (18) and (19) for a tri-linear approximation of bistable element response with stress-strain slopes of $k^I$, $k^S$, $k^{III}$ in phase I, spinodal phase and phase II of element response as shown in FIG. 22, respectively, one can obtain analytical expressions for the magnitude of the $m^{th}$ load drop, $d_m$, in a stack of n bistable elements (FIG. 16D) as:

$$\frac{1}{d_m} \simeq \frac{n-m}{k^I S} + \frac{m}{k^{II} S} \quad (20)$$

where S is the length of the path S shown in FIG. 22.

The invention claimed is:
1. A multistable shape-reconfigurable structure comprising:
  at least two bistable shape-reconfiqurable structures, each bistable shape-reconfigurable structure comprising:
    a rigid base having first and second ends,
    a first rigid beam having a lateral end and a central end, the lateral end being connected to the first end of the base with a first lateral hinge, and
    a second rigid beam having a lateral end and a central end, the lateral end of the second beam being con- nected to the second end of the base with a second lateral hinge, and the central end of the second beam being connected to the central end of the first beam through a single central hinge, the first rigid beam and the second rigid beam are adjoined along the single central hinge such that the first and second rigid beams bend about a line of the single central hinge, wherein the bistable shape-reconfigurable structure is stable in an expanded orientation in which the first and second beams extend outward away from the base and a contracted orientation in which the first and second beams extend inward toward the base, wherein the entire multistable shape-reconfigurable structure is unitarily formed from a single piece of material and wherein all the hinges are flexible living hinges.

2. The multistable shape-reconfigurable structure of claim 1, wherein each bistable shape-reconfigurable structure naturally remains in the expanded orientation or the contracted orientation until a critical force is applied to the bistable shape-reconfigurable structure that transitions the bistable shape-reconfigurable structure into the other orientation.

3. The multistable shape-reconfigurable structure of claim 2, wherein each bistable shape-reconfigurable structure is reversible such that it can be repeatedly placed in either orientation.

4. A multistable shape-reconfigurable structure comprising:
at least two bistable shape-reconfigurable structures, each bistable shape-reconfigurable structure comprising:
a rigid base having first and second ends,
a first rigid beam having a lateral end and a central end, the lateral end being connected to the first end of the base with a first lateral hinge, and
a second rigid beam having a lateral end and a central end, the lateral end of the second beam being connected to the second end of the base with a second lateral hinge, and the central end of the second beam being connected to the central end of the first beam through a single central hinge, the first rigid beam and the second rigid beam are adjoined along the single central hinge such that the first and second rigid beams bend about a line of the single central hinge,
wherein the bistable shape-reconfigurable structure is stable in an expanded orientation in which the first and second beams extend outward away from the base and a contracted orientation in which the first and second beams extend inward toward the base,
wherein one of the beams of each bistable shape-reconfigurable structure is connected to a beam of an adjacent bistable shape-reconfigurable structure.

5. The multistable shape-reconfigurable structure of claim 4, further comprising arms that extend between beams of selected bistable shape-reconfigurable structures.

6. The multistable shape-reconfigurable structure of claim 4, wherein each bistable shape-reconfigurable structure naturally remains in the expanded orientation or the contracted orientation until a critical force is applied to the bistable shape-reconfigurable structure that transitions the bistable shape-reconfigurable structure into the other orientation.

7. The multistable shape-reconfigurable structure of claim 6, wherein each bistable shape-reconfigurable structure is reversible such that it can be repeatedly placed in either orientation.

8. The multistable shape-reconfigurable structure of claim 4, wherein the entire multistable shape-reconfigurable structure is unitarily formed from a single piece of material and wherein all the hinges are flexible living hinges.

9. A multistable shape-reconfigurable structure comprising:
at least two bistable shape-reconfigurable structures, each bistable shape-reconfigurable structure comprising:
a rigid base having first and second ends,
a first rigid beam having a lateral end and a central end, the lateral end being connected to the first end of the base with a first lateral hinge, and
a second rigid beam having a lateral end and a central end, the lateral end of the second beam being connected to the second end of the base with a second lateral hinge, and the central end of the second beam being connected to the central end of the first beam through a single central hinge, the first rigid beam and the second rigid beam are adjoined along the single central hinge such that the first and second rigid beams bend about a line of the single central hinge,
wherein the bistable shape-reconfigurable structure is stable in an expanded orientation in which the first and second beams extend outward away from the base and a contracted orientation in which the first and second beams extend inward toward the base,
wherein the multistable shape-reconfigurable structure has a first square shape when in a fully extended orientation in which each bistable shape-reconfigurable structure is in its extended orientation and wherein the multistable shape-reconfigurable structure has a second square shape when in a fully retracted orientation in which in which each bistable shape-reconfigurable structure is in its contracted orientation.

10. The multistable shape-reconfigurable structure of claim 9, wherein the bases of the bistable shape-reconfigurable structures together form a unitary central member having a star shape and the beams of the bistable shape-reconfigurable structures have a trapezoidal shape.

11. The multistable shape-reconfigurable structure of claim 10, wherein each bistable shape-reconfigurable structure forms an open space between its base and beams when in the expanded orientation, wherein the open space is occupied by the beams when the bistable shape-reconfigurable structure is in the contracted orientation.

12. The multistable shape-reconfigurable structure of claim 9, wherein each bistable shape-reconfigurable structure naturally remains in the expanded orientation or the contracted orientation until a critical force is applied to the bistable shape-reconfigurable structure that transitions the bistable shape-reconfigurable structure into the other orientation.

13. The multistable shape-reconfigurable structure of claim 12, wherein each bistable shape-reconfigurable structure is reversible such that it can be repeatedly placed in either orientation.

14. The multistable shape-reconfigurable structure of claim 9, wherein the entire multistable shape-reconfigurable structure is unitarily formed from a single piece of material and wherein all the hinges are flexible living hinges.

\* \* \* \* \*